(12) United States Patent
Nakajima

(10) Patent No.: US 6,856,593 B2
(45) Date of Patent: Feb. 15, 2005

(54) COMMUNICATION SYSTEM, RELAY APPARATUS, END SYSTEM, AND COMMUNICATING METHOD

(75) Inventor: Masaki Nakajima, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 752 days.

(21) Appl. No.: 09/761,221

(22) Filed: Jan. 16, 2001

(65) Prior Publication Data
US 2001/0046212 A1 Nov. 29, 2001

(30) Foreign Application Priority Data
May 26, 2000 (JP) .................................. 2000-155721

(51) Int. Cl.[7] .............................................. G01R 31/08
(52) U.S. Cl. .................... 370/218; 370/237; 370/242; 370/278
(58) Field of Search ................. 370/278, 229, 370/230, 231, 235, 236, 236.1, 236.2, 237, 241, 242, 248, 249, 401, 218; 455/445

(56) References Cited

U.S. PATENT DOCUMENTS

| | | | | |
|---|---|---|---|---|
| 5,293,295 A | * | 3/1994 | Nishitani | 361/63 |
| 5,361,256 A | * | 11/1994 | Doeringer et al. | 370/390 |
| 5,832,036 A | * | 11/1998 | Nakamura | 375/211 |
| 6,470,453 B1 | * | 10/2002 | Vilhuber | 713/201 |
| 6,487,218 B1 | * | 11/2002 | Ludwig et al. | 370/469 |
| 6,490,289 B1 | * | 12/2002 | Zhang et al. | 370/401 |

* cited by examiner

*Primary Examiner*—Brian Nguyen
(74) *Attorney, Agent, or Firm*—Greer, Burns & Crain, Ltd

(57) ABSTRACT

In a relay apparatus, when an error of the next relay destination is detected at the time of reception of a connection establishment request, the connection establishment request is refused by a connection negative response unit and a negative response relay unit, and a negative response is transmitted to a relay source. When the negative response is received from the relay destination, a connection establishment requesting unit of an end system of a communicating source again issues a connection establishment request in which another relay destination has been selected without notifying an application of a failure of the connection establishment, and establishes a connection to a communicating destination end system by another path.

14 Claims, 22 Drawing Sheets

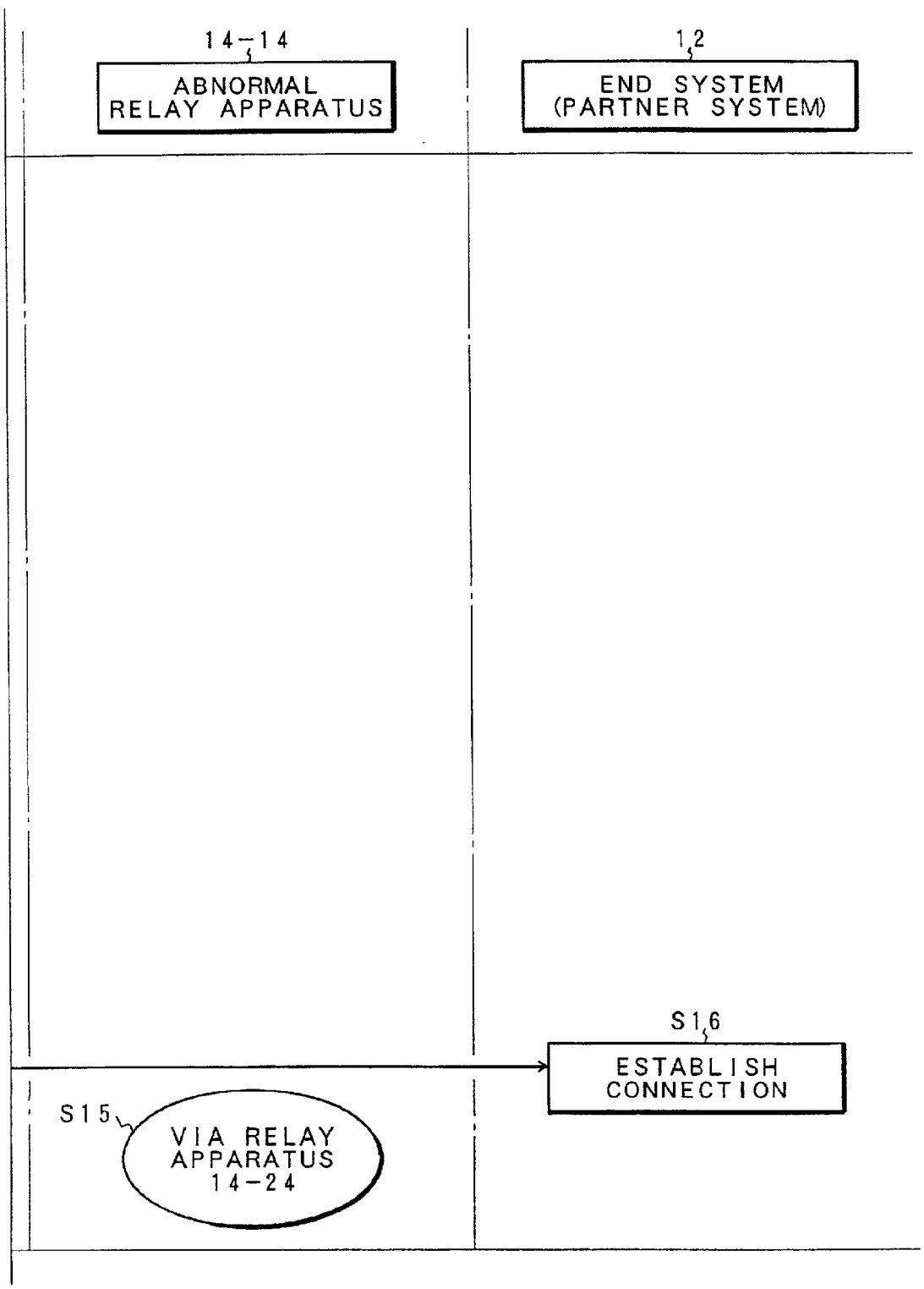

COMMUNICATION SYSTEM, RELAY APPARATUS, END SYSTEM, AND COMMUNICATING METHOD

BACKGROUND OF THE INVENTION

1. Field of the Invention

The present invention relates to a communication system, a relay apparatus, an end system, and a communicating method, in which a connection via a plurality of relay apparatuses is established between end systems for communicating and data is communicated. More particularly, the invention relates to a communication system, a relay apparatus, an end system, and a communicating method, in which upon occurrence of a path fault, it is tried to establish a connection by another path without notifying an application on a communicating source side of a communication error.

2. Description of the Related Arts

Hitherto, in a generally used routing protocol as well as the Internet by which a connection via a plurality of multiplexed relay apparatuses is established and data communication is performed between end systems, the respective relay apparatuses exchange routing information in addition to communication data, thereby selecting the optimum path. In the routing protocol, a verification packet is transmitted at a predetermined period in order to monitor a network, thereby detecting a path fault such as a relay apparatus error or the like. In a large-scale network comprising multi-stage relay apparatuses, there is a case where it requires a predetermined period until routing information is propagated after the path fault occurred.

In such a large-scale network which needs the multi-stage relay apparatuses to a partner destination system, in the case where a path fault is detected and it takes a time of a certain extent until routing information is updated by the routing protocol, if the application of the end system transmits communication data by using the fault path during such a period of time, the connection cannot be established and an error occurs on the application. Therefore, a communicating request or the like is issued again on the application and the path is switched to a new path excluding the erroneous path, thereby newly establishing a connection. There is such a problem that it takes time until communication (business) is started.

SUMMARY OF THE INVENTION

According to the invention, there are provided a communication system, a relay apparatus, an end system, and a communicating method, in which with respect to a network that needs to establish a connection via a multi-stage relay apparatus to a partner destination end system, even if communication data is transmitted during a period of time until path information is updated by a routing protocol and an error is caused due to a path fault, a period of time that is required until a new path is selected and communication is started is shorten.

According to the invention, there is provided a communication system in which a connection via a plurality of relay apparatuses is established between an end system on the communicating source side and an end system on the communicating destination side and data is communicated, wherein each relay apparatus has: a connection negative response unit which, when an error of a next relay destination is detected at the time of reception of a connection establishment request, refuses the connection establishment request and transmits a negative response to the relay source; and a negative response relay unit which, when the negative response is received from the relay destination, transmits the received negative response to the relay source. The end system of the communicating source has a connection establishment requesting unit which, when the negative response is received from the relay destination after the transmission of the connection establishment request, retransmits a connection establishment request which selects another relay destination without notifying the application of a failure of the connection establishment, thereby establishing a connection to the communicating destination end system by another path. Therefore, even if the establishment of the connection fails due to the path fault, the failure is not notified to the application, the connection via another relay apparatus is immediately established from the communicating source end system, and it is unnecessary to retransmit the communicating request from the application. A connection to the partner destination end system in which the fault path is avoided is established in a short time, so that a delay of communication (business) can be avoided. When the path fault is detected upon establishment of the connection, a connection via a new communication path can be established in a real-time manner. Therefore, even when a large-scale multiplexed network such as Internet, provider, or the like is switched, it is unnecessary to monitor a fault to the end system. Further, since only a packet which is used for communication is used, a special mechanism for the fault monitor such as "ping" is not needed. Naturally, the mechanism for the fault monitor such as "ping" can be also used in parallel.

The end system of the communicating source has a plurality of relay apparatuses as a plurality of relay destinations. When a negative response is received after a specific relay apparatus is selected and a connection establishment request is transmitted, the end system selects another relay apparatus and retransmits the connection establishment request. The end system of the communicating source has a plurality of relay adapters which are provided as a plurality of relay destinations for one relay apparatus. When the negative response is received after a specific relay adaptor is selected and the connection establishment request is transmitted, the end system can select another relay adaptor and retransmit the connection establishment request. According to the invention, as mentioned above, fundamentally, a plurality of relay destinations are provided for the communicating source end system, in response to the negative response which is returned due to the path fault, another relay destination is selected by the communicating source end system, and the connection establishment request is retransmitted. Further, in response to the negative response at a stage of the relay apparatus at the halfway, it is also possible to select another relay destination and retransmit the connection establishment request. That is, the relay apparatus is equipped with a relay selecting unit which, when the negative response is received from the relay destination after completion of the relay of the connection establishment request, retransmits the connection establishment request in which another relay destination has been selected, and establishes a connection to the communicating destination end system by another path. The relay apparatus has a plurality of adapters which are provided as a plurality of relay destinations for one relay apparatus. When the negative response is received after a specific relay adaptor is selected and the connection establishment request is transmitted, the relay apparatus can select another relay adapter and retransmit the connection establishment request. As mentioned above, in response to the negative response returned due to the path fault, the connection establishment request in which another relay destination has been selected is retransmitted at the stage of the relay apparatus having a plurality of relay destinations at the halfway of the network, thereby establishing the connection to the communicating destination end system by another path. Consequently, such troublesomeness that the negative response is returned to the end system of the communicating source and another relay destination is selected is swept away and, further, the communication can be started in a short time. In case of the TCP/IP protocol, each of the end systems and relay apparatuses in the communication system of the invention switches the communication paths by 4-layer switches for establishing a TCP connection. The negative response unit of the relay apparatus stores refusal reasons and information of the location of the fault occurrence relay apparatus into an optional area or a user data area of a negative response packet and transmits the packet to the relay source. From the contents of the negative response packet, the end system can recognize in which relay apparatus the connection is refused and for what reasons. When the negative response packet is received, the connection establishment requesting unit of the communicating source end system changes the status of the relay destination where the fault path was caused into an unusable state, after that, selects another relay destination, and retransmits the connection connecting request. As mentioned above, by combining with the fault monitor, wasteful retransmission or connection delay can be avoided with respect to the communication which was caused during a period of time until an error can be detected by the fault monitor. In this instance, the location information of the abnormal relay apparatus which is stored in the negative response packet includes an IP address of the abnormal relay apparatus and the number of hopping times indicative of the number of normal relay apparatuses to the abnormal apparatus. The negative response relay unit of the relay apparatus can further store the self IP address into the optional area or user data area of the negative response packet and transmit the packet to the relay source. Consequently, the relay apparatuses existing on the path to the abnormal relay apparatus can be recognized.

According to the invention, a relay apparatus itself for establishing a connection between an end system of the communicating source and an end system of the communicating destination and communicating data is provided. The relay apparatus comprises: a connection negative response unit which, when an error of a relay destination is detected upon reception of a connection establishment request, refuses the connection establishment request and transmits a negative response to a relay source; and a negative response relay unit which, when the negative response is received from the relay destination, transmits the received negative response to the relay source. The negative response unit of the relay apparatus stores refusal reasons, an IP address of the abnormal relay apparatus indicative of a position of a fault occurrence relay apparatus, and the number of hopping times indicative of the number of normal relay apparatuses to the abnormal relay apparatus into an optional portion or a user data area of a negative response packet and transmits them to the relay source.

According to the invention, an end system for establishing a connection via a plurality of relay apparatuses and communicating data is provided. The end system comprises: an application which issues a communicating request to a specific end system as a partner destination; and a connection establishment requesting unit which, when a negative response is received from a relay destination after transmission of a connection establishment request based on the communicating request, retransmits the connection establishment request in which another relay destination has been selected and establishes a connection to a communicating destination end system by another path without notifying an application of a connection establishment failure. When the negative response packet is received, the connection establishment requesting unit of the end system changes the status of the relay destination where the fault path is caused into an unusable state, after that, selects another relay destination, and retransmits the connection connecting request.

According to the invention, there is further provided a communicating method of establishing a connection via a plurality of relay apparatuses between an end system of a communicating source and an end system of a communicating destination and communicating data. According to the communicating method, when an error of the relay destination is detected upon reception of a connection establishment request, one of the relay apparatuses refuses the connection establishment request and transmits a negative response to the relay source, the relay apparatus which received the negative response from the relay destination transmits the received negative response to the relay source, and when the negative response is received from the relay destination after transmission of the connection establishment request, the end system of the communicating source retransmits the connection establishment request in which another relay destination has been selected and establishes a connection to the communicating destination end system by another path without notifying an application of a connection establishment failure. The details of the communicating method are fundamentally the same as those of the communication system.

The above and other objects, features, and advantages of the present invention will become more apparent from the following detailed description with reference to the drawings.

BRIEF DESCRIPTION OF THE DRAWINGS

FIGS. 15A, 15B, and 15C are time charts for the switching process in FIG. 14;

DETAILED DESCRIPTION OF THE PREFERRED EMBODIMENTS

Figure 1:
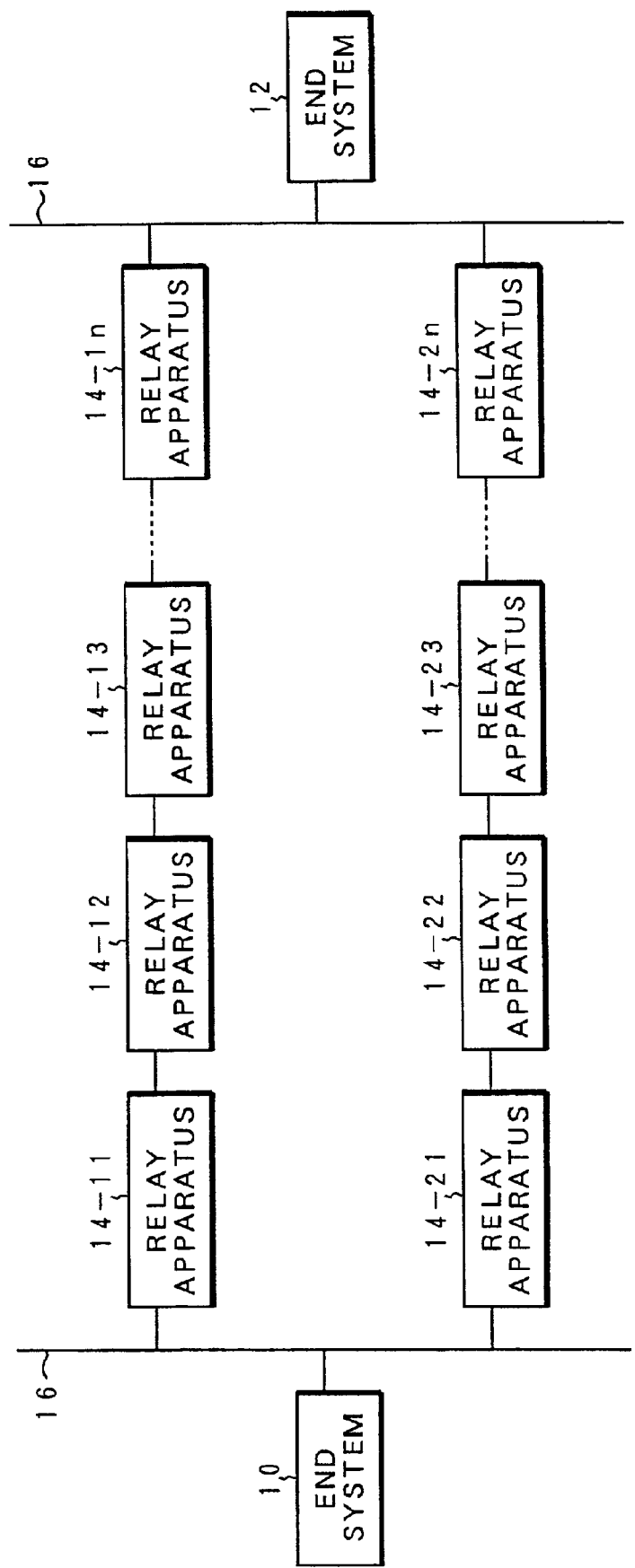
FIG. 1 is an explanatory diagram of a network in the first embodiment of the invention in which a connection establishment request is switched in an end system.

FIG. 1 shows the first embodiment of a communication system according to the invention and is characterized in that a connection establishment request is switched on the end system side at the time of occurrence of a path fault. A network which constructs the communication system of the invention has an end system (self system) 10 serving as a communicating source and an end system (partner destination system) 12 serving as a communicating destination. A large-scale network which is multi-stage constructed by a plurality of relay apparatuses 14-11 to 14-1n and 14-21 to 14-2n and transmission paths 16 is constructed between the end systems 10 and 12. For example, there is the Internet, Ethernet, or the like as such a network.

Figure 2:
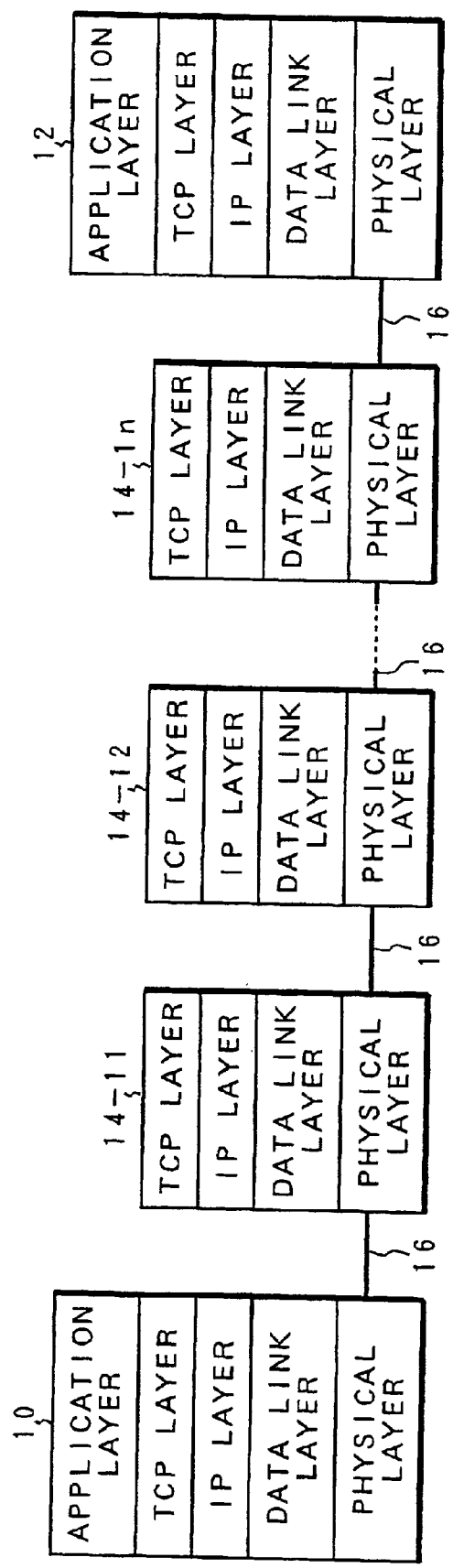
FIG. 2 is an explanatory diagram of a layer structure of the end system and relay apparatuses in FIG. 1.

FIG. 2 shows a layer structure of the end systems 10 and 12 and the relay apparatuses with respect to the side of the relay apparatuses 14-11 to 14-1n. This network corresponds to a TCP/IP protocol. Each of the end systems 10 and 12 and the relay apparatuses 14-11 to 14-1n has a physical layer, a data link layer, an IP layer, and a TCP layer. Further, each of the end systems 10 and 12 has an application layer for performing communication (business) on the TCP layer. Therefore, a network such that a connection via a plurality of relay apparatuses is established between the end system 10 as a communicating source and the end system 12 as a communicating destination and data is communicated according to the invention in FIG. 1 establishes a TCP connection and performs a network switching by 4-layer switches each of which is known as a gateway.

Figure 3:
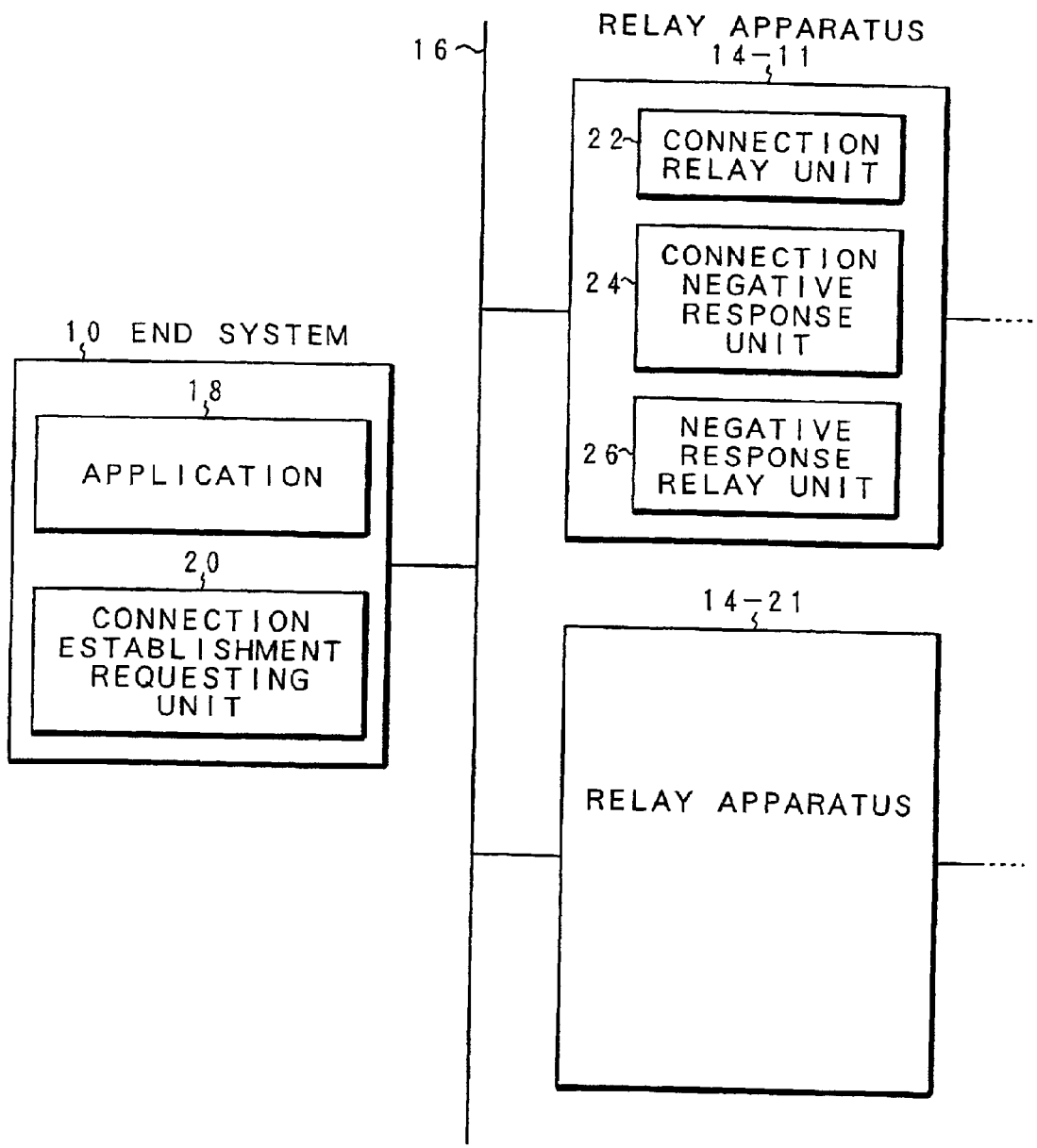
FIG. 3 is a block diagram of a functional construction of the end system and the relay apparatuses in FIG. 1.

FIG. 3 shows a functional construction of each of the end system 10 and relay apparatus 14-11 extracted from FIG. 1. The end system 10 comprises an application unit or application 18 and a connection establishment requesting unit 20. The application 18 is constructed by application software for executing communication (business) with the end system of the partner destination and exists in an application layer in FIG. 2. The connection establishment requesting unit 20 is arranged in the TCP layer in FIG. 2. When a communicating request to an arbitrary partner destination end system is received from the application 18, the connection establishment requesting unit 20 transmits a connection establishment request packet for establishing a TCP connection, specifically speaking, an SYN packet to, for example, the relay apparatus 14-11 serving as a relay destination through the transmission path 16 in accordance with a routing protocol of TCP/IP. The connection establishment request packet transmitted from the end system 10 to the relay apparatus side as mentioned above establishes a connection by a relay transfer of the connection establishment request packet to the end system 12 via the relay apparatuses 14-11, 14-12, 14-13, and 14-1n, for example, in FIG. 1. When a connection establishment response is derived from the end system 12, data communication from the application 18 is started.

The relay apparatus 14-11 in FIG. 3 has a connection relay unit 22, a connection negative response unit 24, and a negative response relay unit 26. When the connection establishment request packet is received from the end system 10 serving as a relay source or from another relay apparatus, the connection relay unit 22 discriminates a status of the next adjacent relay destination and transmits the connection establishment request packet if the status is normal. At this time, the number of hopping times of an optional area or a user area of the connection establishment request packet is counted and transmitted. When the connection establishment request packet is received from the end system 10 or another relay apparatus, the connection negative response unit 24 discriminates a status of the next adjacent relay destination. When the status is abnormal, the connection negative response unit 24 refuses the connection establishment request to the next relay destination and transmits a negative response packet for refusing the establishment of a TCP connection, specifically speaking, an RST packet or an FIN packet to the end system 10 serving as a relay source or another relay apparatus, thereby disconnecting the connection.

Figure 4:
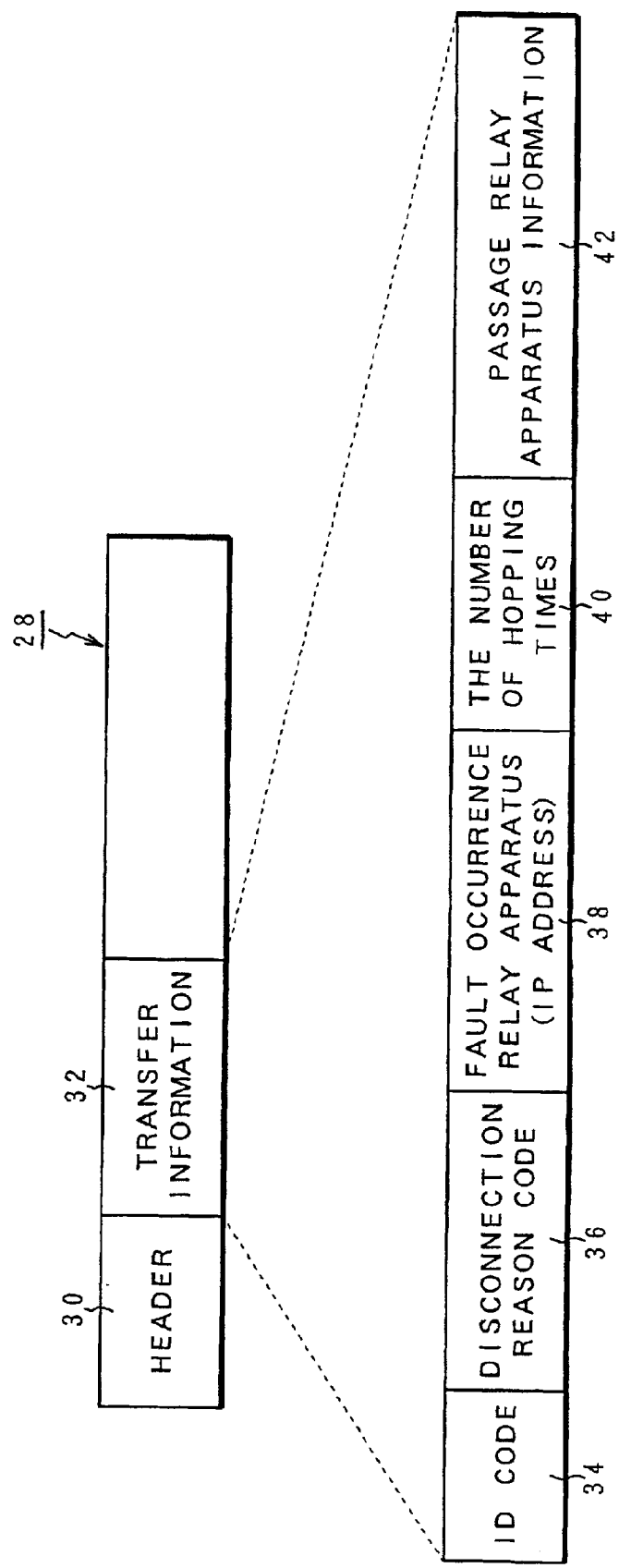
FIG. 4 is an explanatory diagram of a negative response packet which is transmitted at the time of detection of an error of a relay destination.

The negative response packet which is transmitted by the connection negative response unit 24 has a packet format of FIG. 4. A negative response packet 28 comprises a header 30 and transfer information 32. The header 30 has a construction as a TCP protocol header. Refusal reasons of the TCP connection, location information of the fault occurrence relay apparatus, and the like are stored in the transfer information 32. For example, as shown on the lower side of the diagram, an ID (identification) code 34 indicative of the transfer information, a disconnection reason code 36, a fault occurrence relay apparatus (IP address) 38, and the number of hopping times 40 are stored in the transfer information 32. Subsequently to the number of hopping times 40, IP addresses are sequentially stored as apparatus information of the passage relay apparatuses at the time of relaying the negative response packet 28. Such passage relay apparatus information 42 is selective information and stored as necessary.

Referring again to FIG. 3, when the negative response packet 28 in FIG. 4 which was relayed from another adjacent relay apparatus is received, the negative response relay unit 26 of the relay apparatus 14-11 transmits the negative response packet 28 as it is to the end system 10 serving as a relay source. At this time, as transfer information 32 in FIG. 4, the negative response relay unit 26 can also store the self IP address as passage relay information 42. After the connection establishment requesting unit 20 of the end system 10 transmitted the connection establishment request packet to the relay apparatus 14-11 on the basis of a communicating request from the application 18, when the negative response packet is received from the relay apparatus 14-11, the connection establishment requesting unit 20 discriminates whether there is another relay destination or not without notifying the application 18 of the failure of the connection establishment. In this case, since the relay apparatus 14-21 exists as another relay destination, the connection establishment requesting unit 20 again transmits the connection establishment request packet to the relay apparatus 14-21, thereby establishing a connection to the end system 12 of the communicating destination by another path from the relay apparatus 14-21. When the negative response packet is received from the relay apparatus 14-11, the connection establishment requesting unit 20 changes the status of the relay apparatus 14-11 as a relay destination at the time of communication in which the path fault was caused to an unusable state on the basis of the transfer information 32 stored in the optional area or user area in the negative response packet 28 shown in FIG. 4, thereby enabling the relay apparatus 14-21 side which can establish a normal communication path from the beginning to be selected as a relay destination when the communicating request to the same end system 12 is generated from the application 18 after that.

Figure 5:
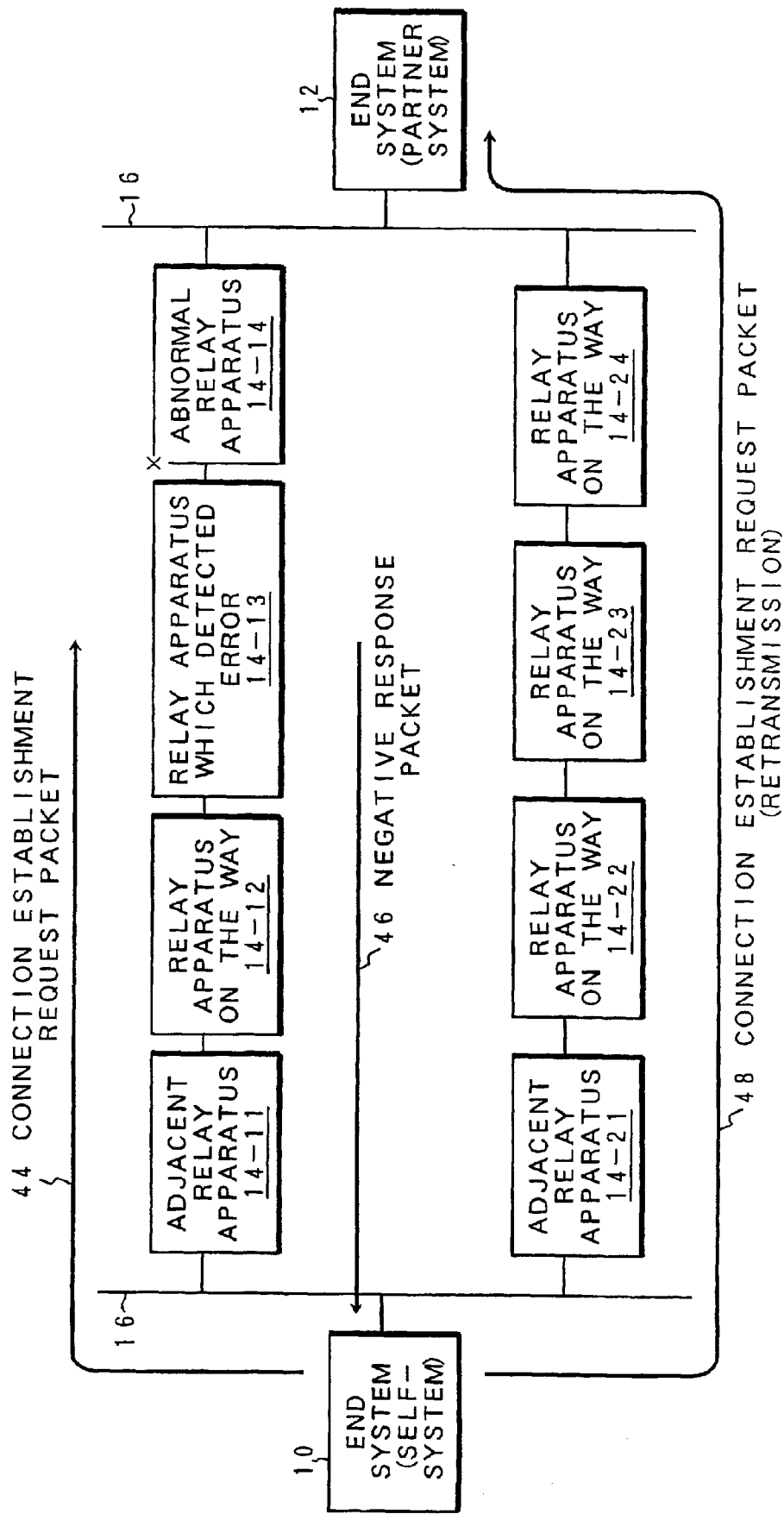
FIG. 5 is an explanatory diagram of a switching process according to the first embodiment of FIG. 1.

FIG. 5 is an explanatory diagram of a communicating process in the case where a path fault is caused in response to the connection establishment request and the path is switched on the end system side of the communicating source with respect to the first embodiment of FIG. 1. When the communicating request is issued from the application of the end system 10, the end system 10 transmits the connection establishment request packet to, for example, the adjacent relay apparatus 14-11. The connection establishment request packet is further relayed from the adjacent relay apparatus 14-11 to the relay apparatuses 14-12 and 14-13 at the halfway. Now, assuming that an error occurred in the relay apparatus 14-14 located in front of the end system 12 of the communicating destination, when the relay apparatus 14-13 receives the connection establishment request packet from the relay apparatus 14-12, a status of the relay apparatus 14-14 as a next relay destination is discriminated, so that it is recognized that it is abnormal. Therefore, the relay apparatus 14-13 which detected the error of the next relay destination refuses the establishment of the TCP connection, forms a negative response packet 46 having the format contents of FIG. 4, and transmits it to the relay apparatus 14-12 of the relay source. The relay apparatus 14-12 which received the negative response packet 46 does not change the packet contents but adds a self IP address as necessary, thereby transmitting the resultant packet to the one-preceding relay apparatus 14-11 of the relay source. In a manner similar to the above, the relay apparatus 14-11 also transmits the negative response packet 46 to the end system 10 of the communicating source. By this reception, the end system 10 recognizes the occurrence of the path fault due to the error of the relay apparatus 14-14 and discriminates the presence or absence of another relay apparatus having a path other than the fault occurrence path without notifying the application 18 of the failure of the TCP connection establishment. In this case, since the adjacent relay apparatus 14-21 exists as another relay destination, the end system 10 retransmits a connection establishment request packet 48 in which the same end system 12 is set to the communicating destination to the adjacent relay apparatus 14-21. The connection establishment request packet 48 transmitted to the relay apparatus 14-21 is sequentially relayed by the relay apparatuses 14-22, 14-23, and 14-24 at the halfway. After that, it finally reaches the end system 12. Thus, the TCP connection is established with the communicating destination end system 12. By receiving the connection establishment response, the end system 10 of the communicating source starts the data communication from the application.

Figure 6A:
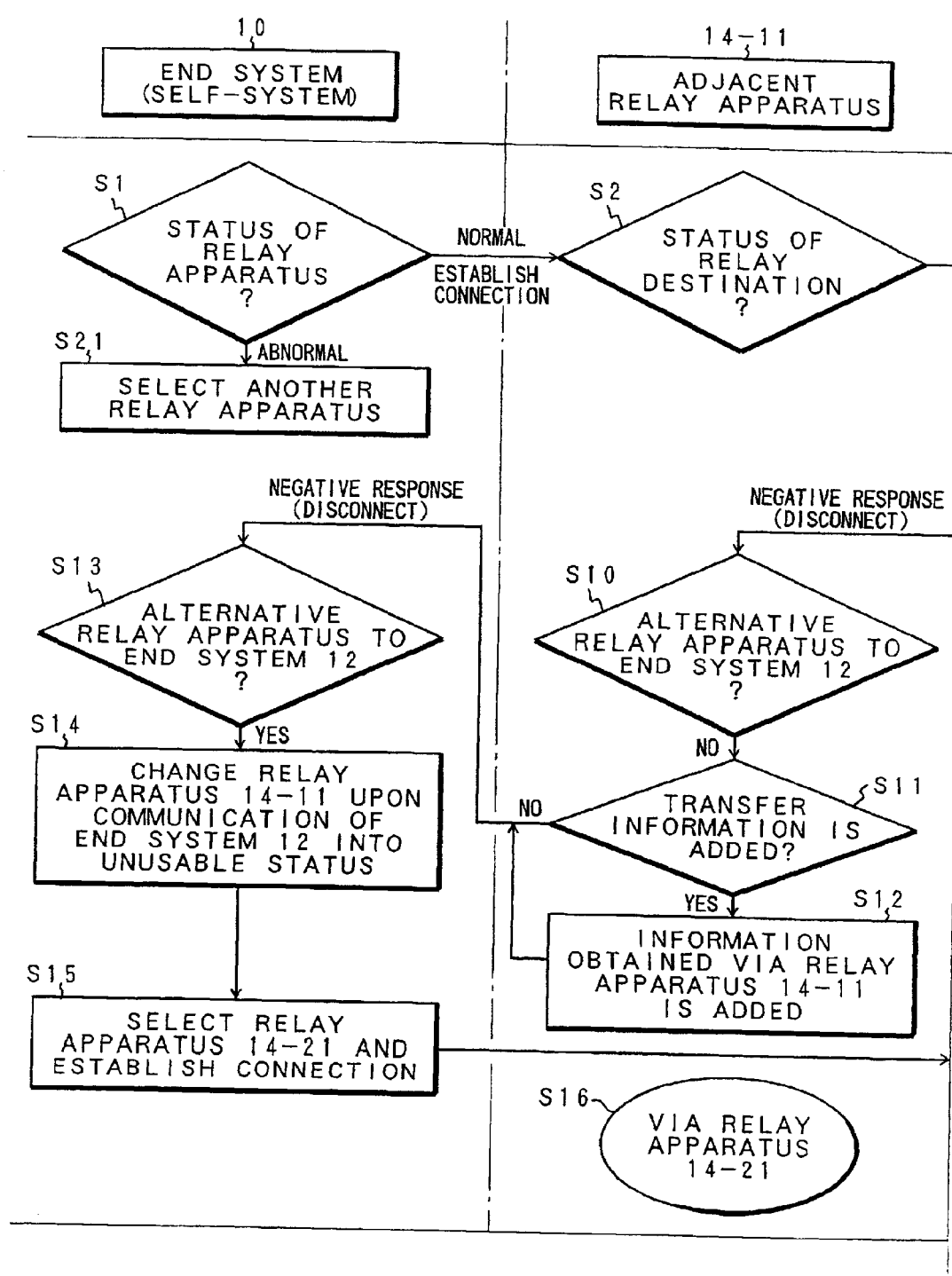
FIGS. 6A, 6B, and 6C are time charts for the switching process in FIG. 5.
Figure 6B:
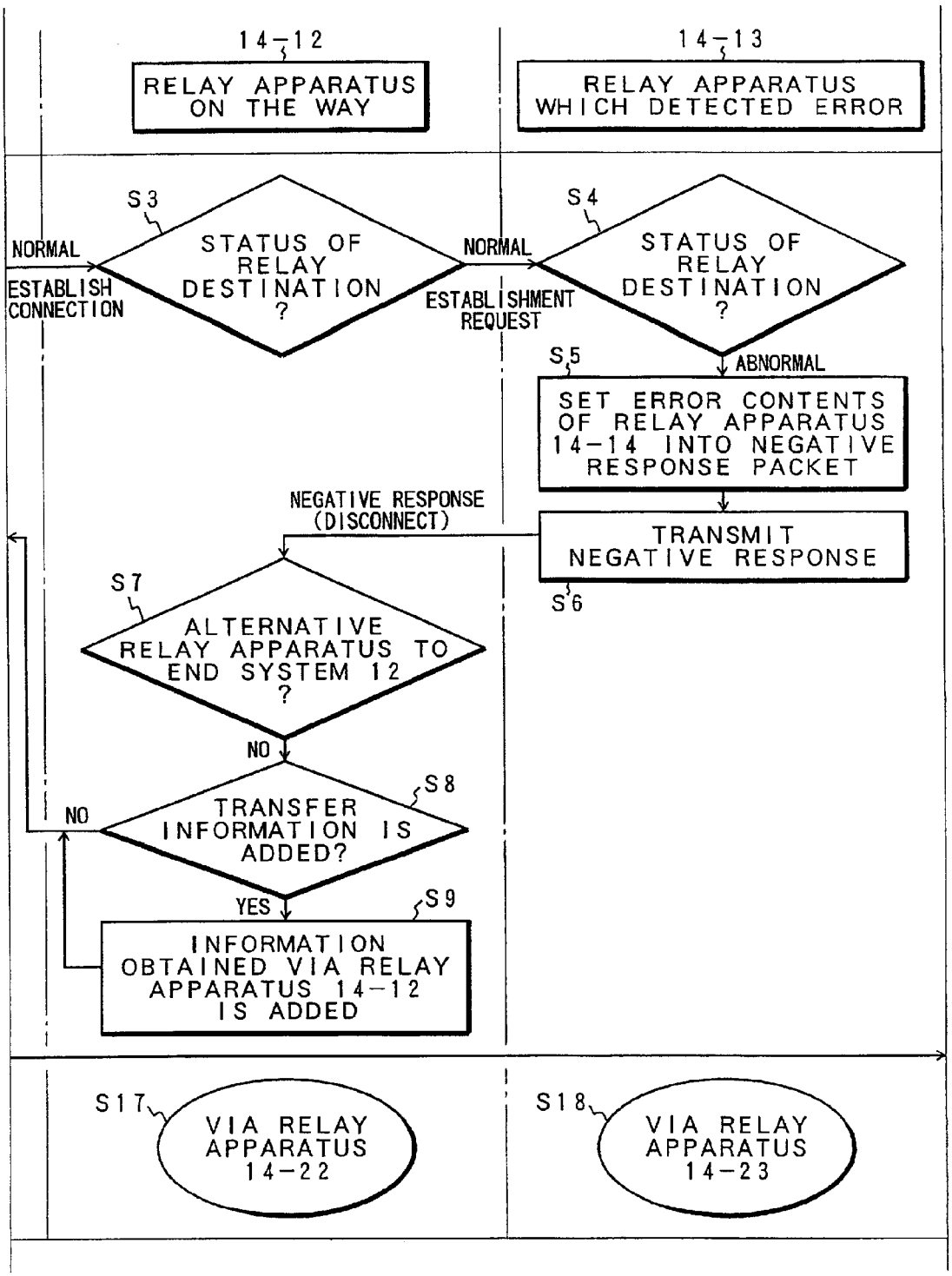
Figure 6C:
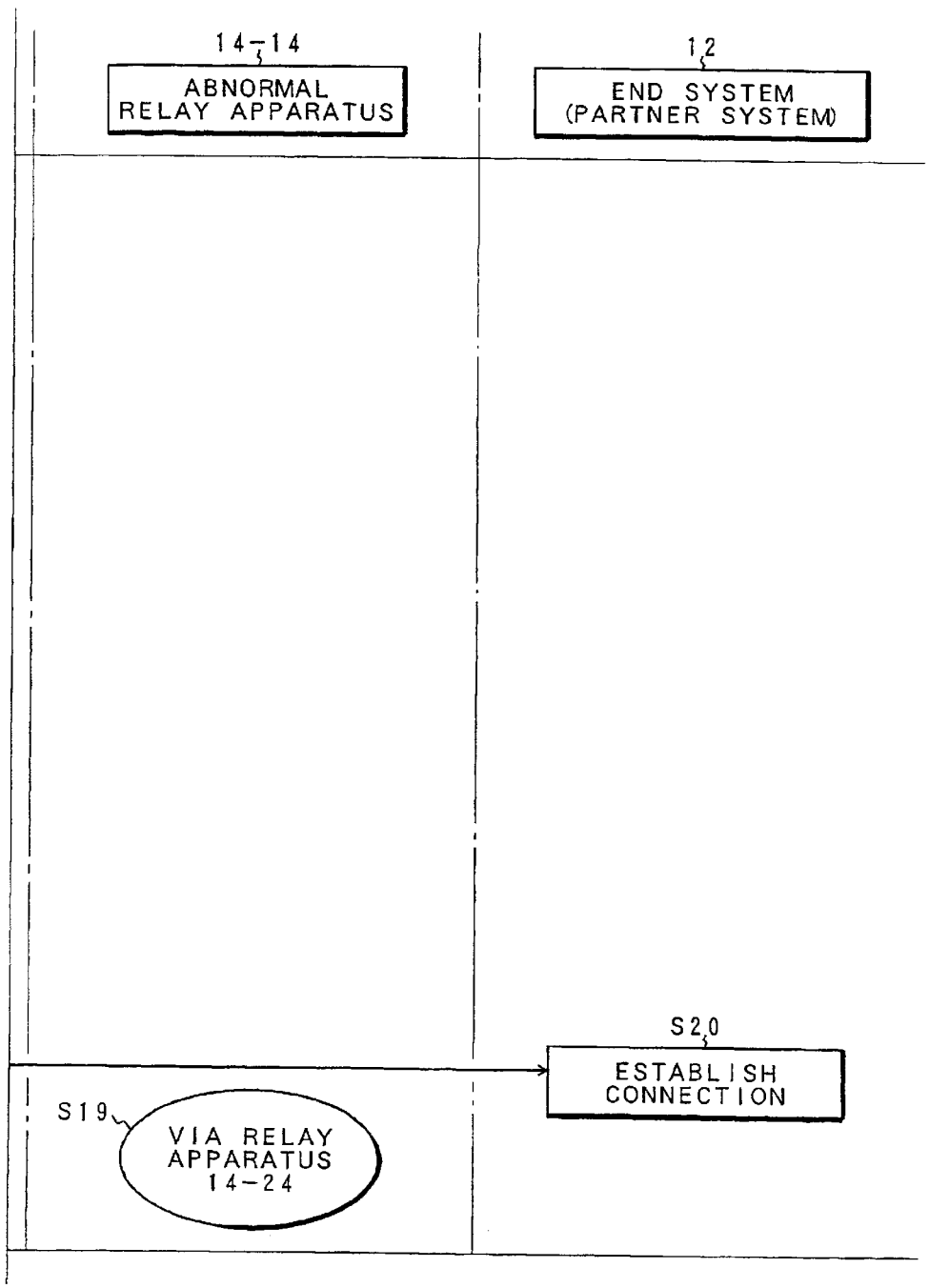

FIGS. 6A, 6B, and 6C are time charts showing the details of the switching operation on the end system 10 side in FIG. 5. The end system selects the adjacent relay apparatus 14-11 as a relay destination on the basis of the communicating request from the application unit and discriminates the status of the relay apparatus 14-11 in step S1. At this time, since the status of the relay apparatus 14-11 is normal, the connection establishment request packet is transmitted, thereby establishing a connection. If the status is abnormal, another relay apparatus is selected in step S21. The adjacent relay apparatus 14-11 which received the connection establishment request packet from the end system 10 discriminates the status of the next relay apparatus 14-21 serving as a relay destination in step S2. In this case, since the relay apparatus 14-21 is normal, the connection establishment request packet is transmitted to the relay apparatus 14-21, thereby establishing a connection. A status of the relay apparatus 14-13 serving as a next relay destination of the relay apparatus 14-21 is discriminated in step S3. Since it is normal in this case, the connection establishment request is similarly issued, thereby establishing a connection. The relay apparatus 14-13 discriminates a status of the relay apparatus 14-14 serving as a next relay destination and recognizes the occurrence of an error in the relay apparatus 14-14. The processing routine advances to step S5 and the error contents of the relay apparatus 14-14 serving as a relay destination are set into the negative response packet. In step S6, the negative response packet is transmitted to the relay apparatus 14-21 of the relay source, thereby disconnecting the connection. The relay apparatus 14-21 which received the negative response packet from the relay apparatus 14-13 discriminates the presence or absence of an alternative relay apparatus to the end system 12 serving as a communicating destination in step S7. Since no alternative relay apparatus exists in this case, whether the transfer information is added or not is discriminated in step S8. If YES, for example, the IP address showing the passage through the relay apparatus 14-21 is added to the negative response packet in step S9. The negative response packet is transmitted to the relay apparatus 14-11 as a relay source, thereby disconnecting the connection. Also in the relay apparatus 14-11, the presence or absence of an alternative relay apparatus to the end system 12 is discriminated in step S10. Since the alternative relay apparatus does not exist in this case either, the presence or absence of the addition of the transfer information is discriminated in step S11. If there is the alternative relay apparatus, the self IP address is added in step S12 and, thereafter, the negative response packet is transmitted to the end system 10 serving as a relay source, thereby disconnecting the connection. The end system 10 of the communicating source which received the negative response packet from the adjacent relay apparatus 14-11 discriminates the presence or absence of an alternative relay apparatus to the end system 12 of the communicating destination in step S13. Since there is the alternative relay apparatus 14-21 in this case, step S14 follows. The status of the relay apparatus 14-11 upon communication of the end system 12 in which the path fault occurred is changed to the unusable state. After that, the relay apparatus 14-21 as an alternative relay apparatus is selected in step S15 and the connection establishment request packet is transmitted. As shown in steps S16, S17, S18, and S19, the connection establishment request packet returned by the end system 10 is relayed to the end system 12 in step S20 via the relay apparatuses 14-21, 14-22, 14-23, and 14-24. A connection is established and data communication is started by the end system 10 on the basis of the connection establishment.

Figure 7:
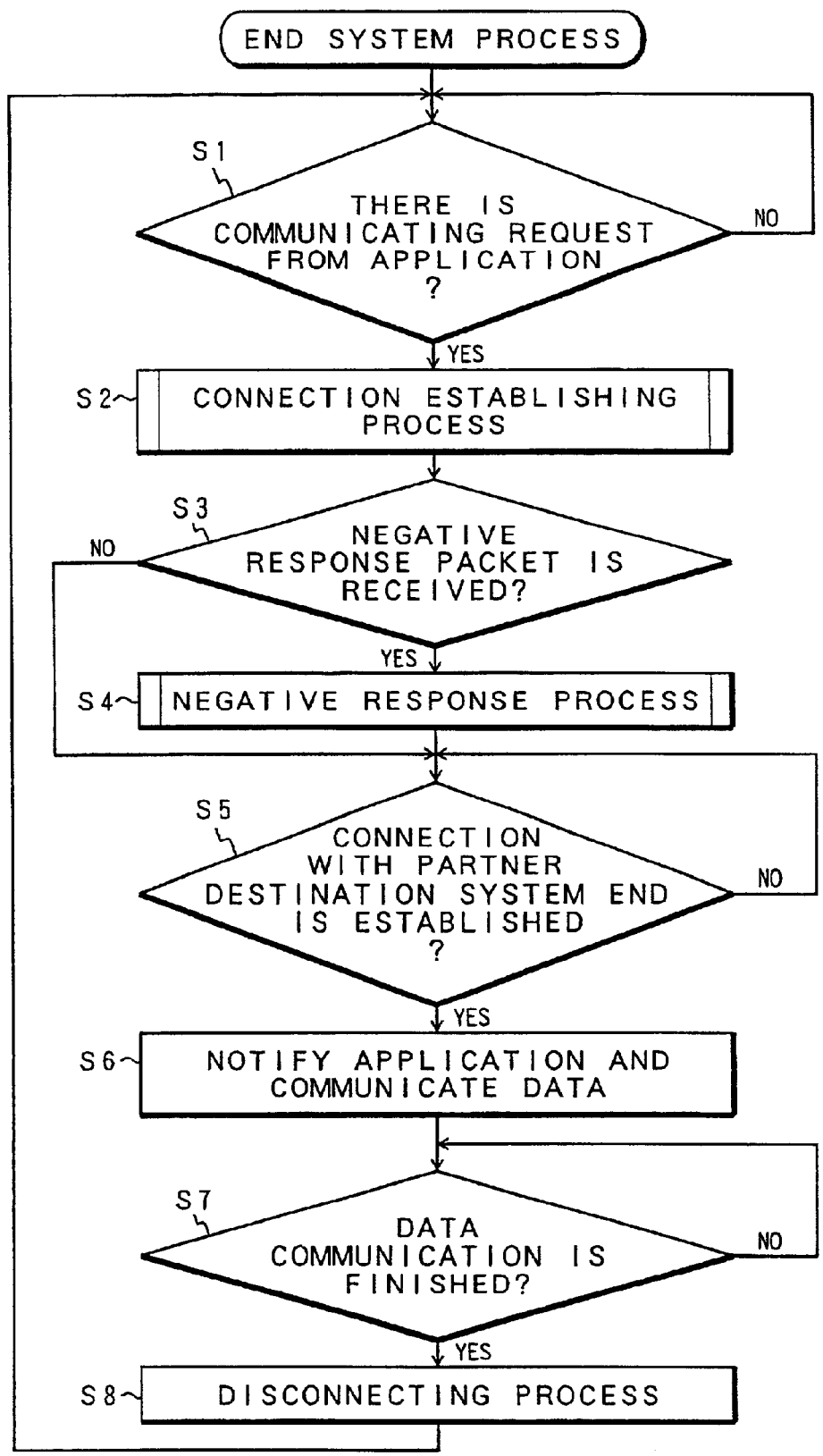
FIG. 7 is a flowchart for the processing operation of the end system in FIG. 3.

FIG. 7 is a flowchart for the end system process by the connection establishment requesting unit 20 provided for the end system 10 in FIG. 3. In the end system process, when the communicating request is issued from the application in step S1, a connection establishing process to the adjacent relay apparatus is executed in step S2. After completion of the connection establishing process, if the negative response packet is received from the adjacent relay apparatus in step S3, a negative response process is executed in step S4. If a connection with the end system of the partner destination is established in step S5, the application is notified of the connection establishment and data communication is performed in step S6. If the end of the data communication is determined in step S7 with respect to the data communication, a process for disconnecting the connection is performed in step S8.

Figure 8:
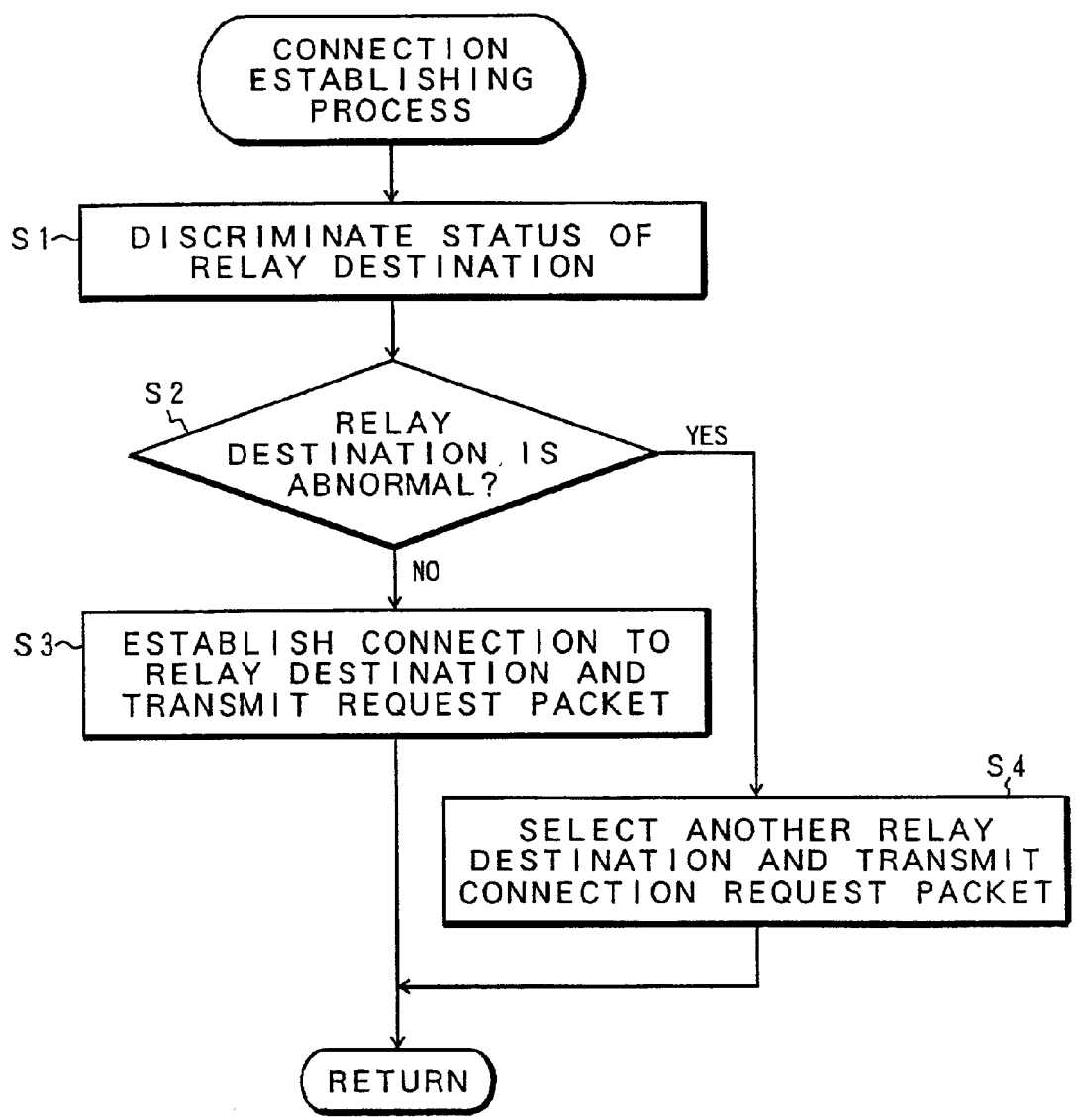
FIG. 8 is a flowchart for a connection establishing process in FIG. 7.

FIG. 8 shows the details of the connection establishing process in step S2 in the end system process in FIG. 7. In the connection establishing process, a status of the relay destination is discriminated in step S1. If the relay destination is normal in step S2, the connection establishment request packet is transmitted to the relay destination in step S3. If the relay destination is abnormal in step S2, another relay destination is selected and the connection establishment request packet is transmitted.

Figure 9:
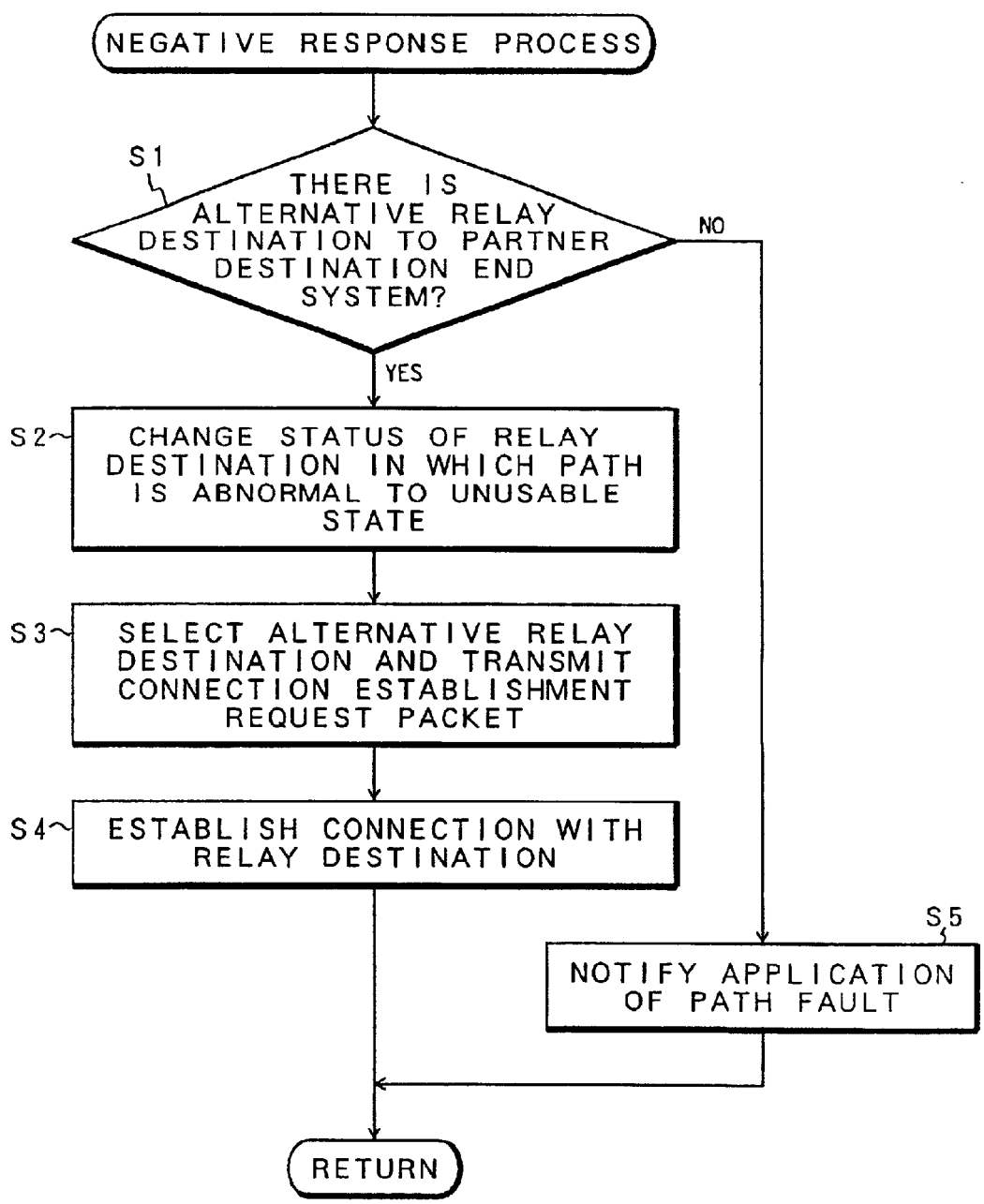
FIG. 9 is a flowchart for a negative response process in FIG. 7.

FIG. 9 shows the details of the negative response process in step S4 in the end system process in FIG. 7. In the negative response process in the end system, when the negative response packet is received from the relay destination, first, in step S1, the presence or absence of an alternative relay destination of the partner destination end system is discriminated. If there is the alternative relay destination, the status of the relay destination in which the path error occurred is changed to the unusable state in step S2. After that, the alternative relay destination is selected and the connection establishment request packet is transmitted in step S3. A connection with the relay destination is established in step S4. If there is no alternative relay destination in step S1, a path fault is notified to the application in step S5.

Figure 10:
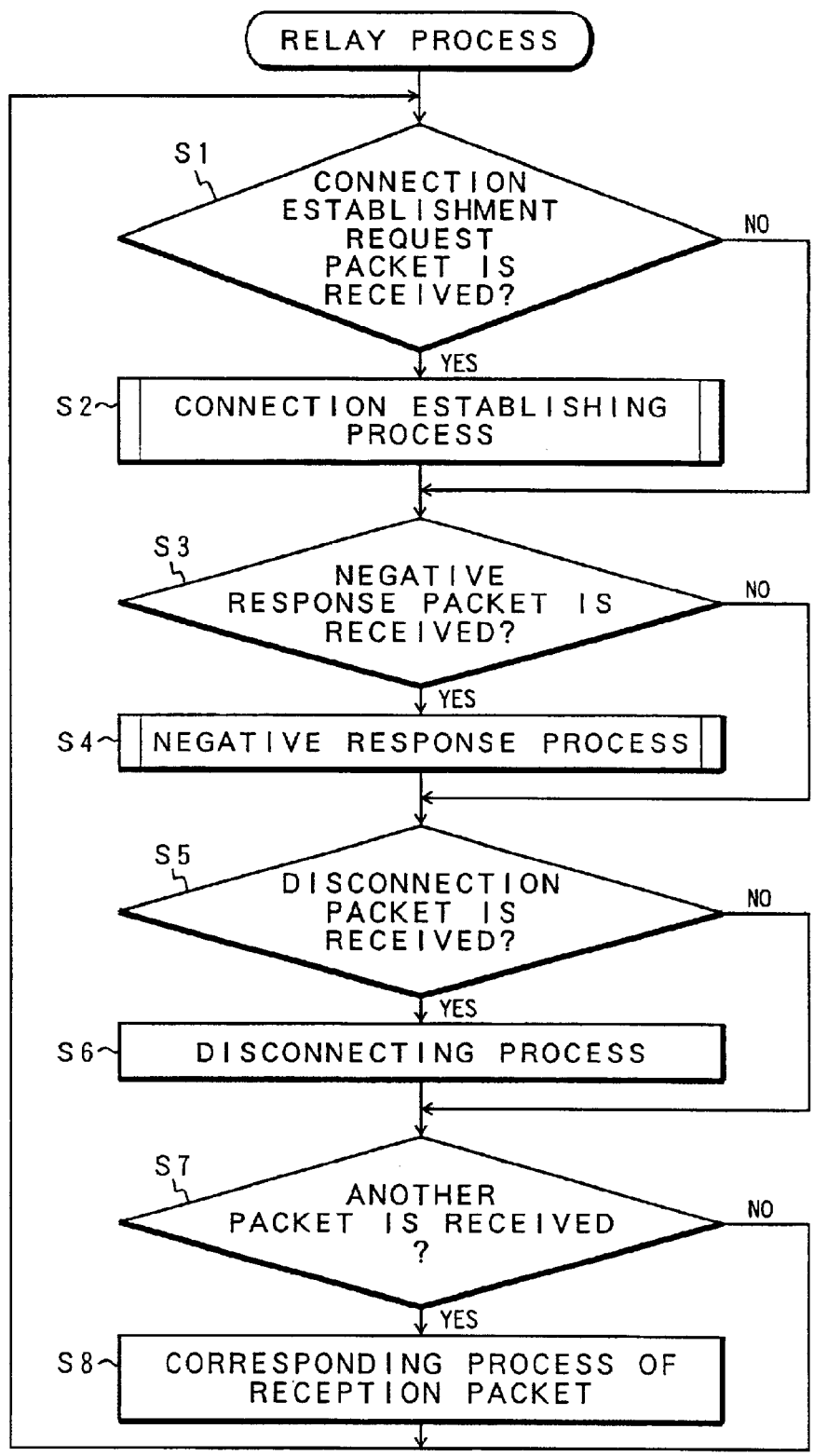
FIG. 10 is a flowchart for a relay process by the relay apparatuses in FIG. 3.

FIG. 10 is a flowchart for the relaying process by the connection relay unit 22, connection negative response unit 24, and negative response relay unit 26 of the relay apparatus 14-11 representatively shown in FIG. 3. In the relay process, whether the connection establishment request packet has been received from the end system or another relay apparatus or not is discriminated in step S1. When the packet is received, a connection establishing process is executed in step S2. After completion of the connection establishing process in step S2, if the reception of the negative response packet from the relay destination is decided in step S3, step S4 follows and a negative response process is executed. Further, when a connection disconnection packet accompanied by the communication end of the end system is received in step S5, a connection disconnecting process is performed in step S6. Further, when another packet is received in step S7, a process corresponding to the received packet is executed in step S8.

Figure 11:
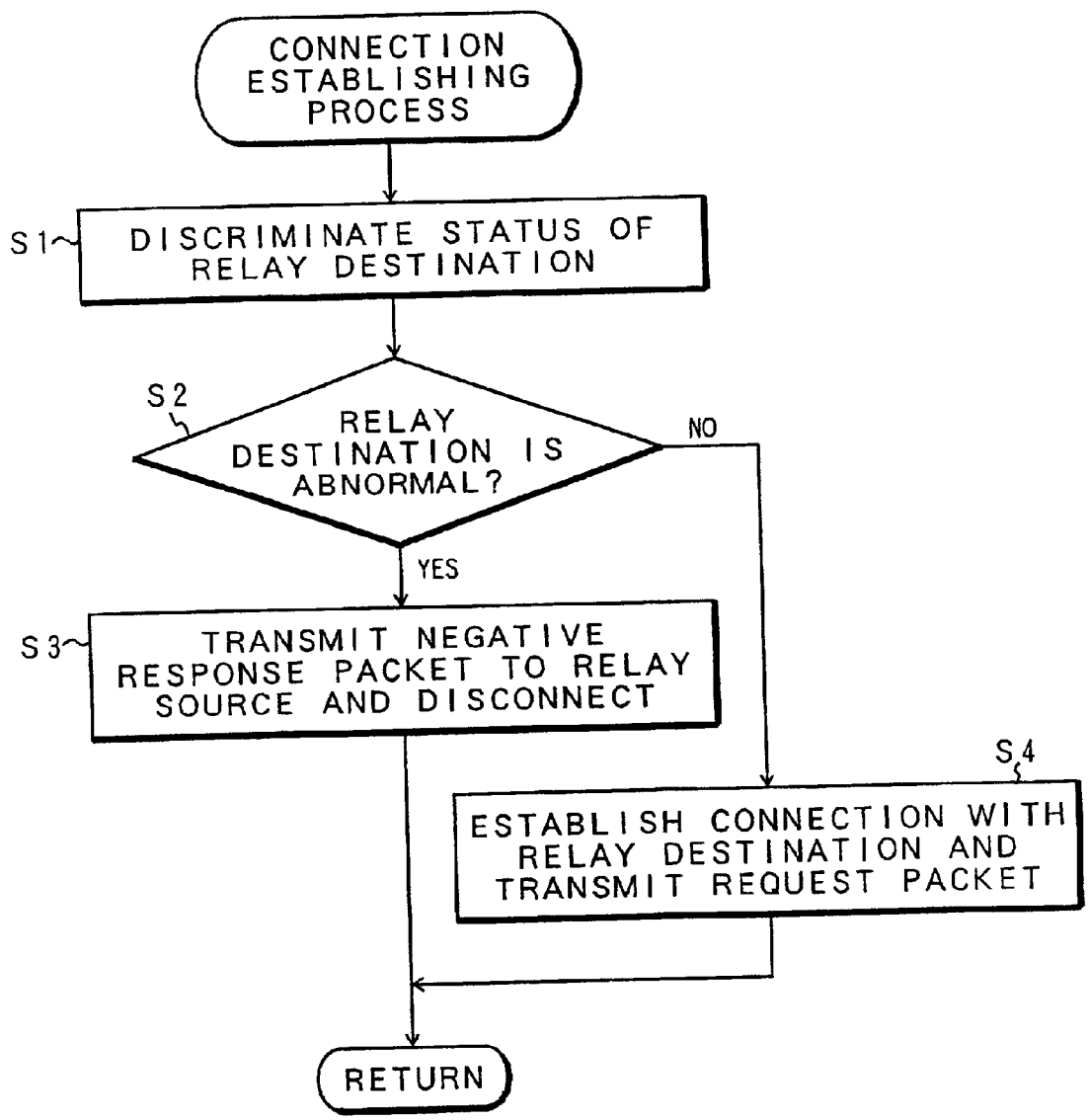
FIG. 11 is a flowchart for a connection establishing process in FIG. 10.

FIG. 11 is a flowchart for the connection establishing process in the relay process in step S2 in FIG. 10. In the connection establishing process in the relay apparatus, a status of the next relay destination is discriminated in step S1. If the relay destination is not abnormal in step S2, the connection establishment request packet of the relay destination is transmitted in step S4. If the relay destination is abnormal, the negative response packet is transmitted to the relay source, thereby disconnecting the connection in step S3.

Figure 12:
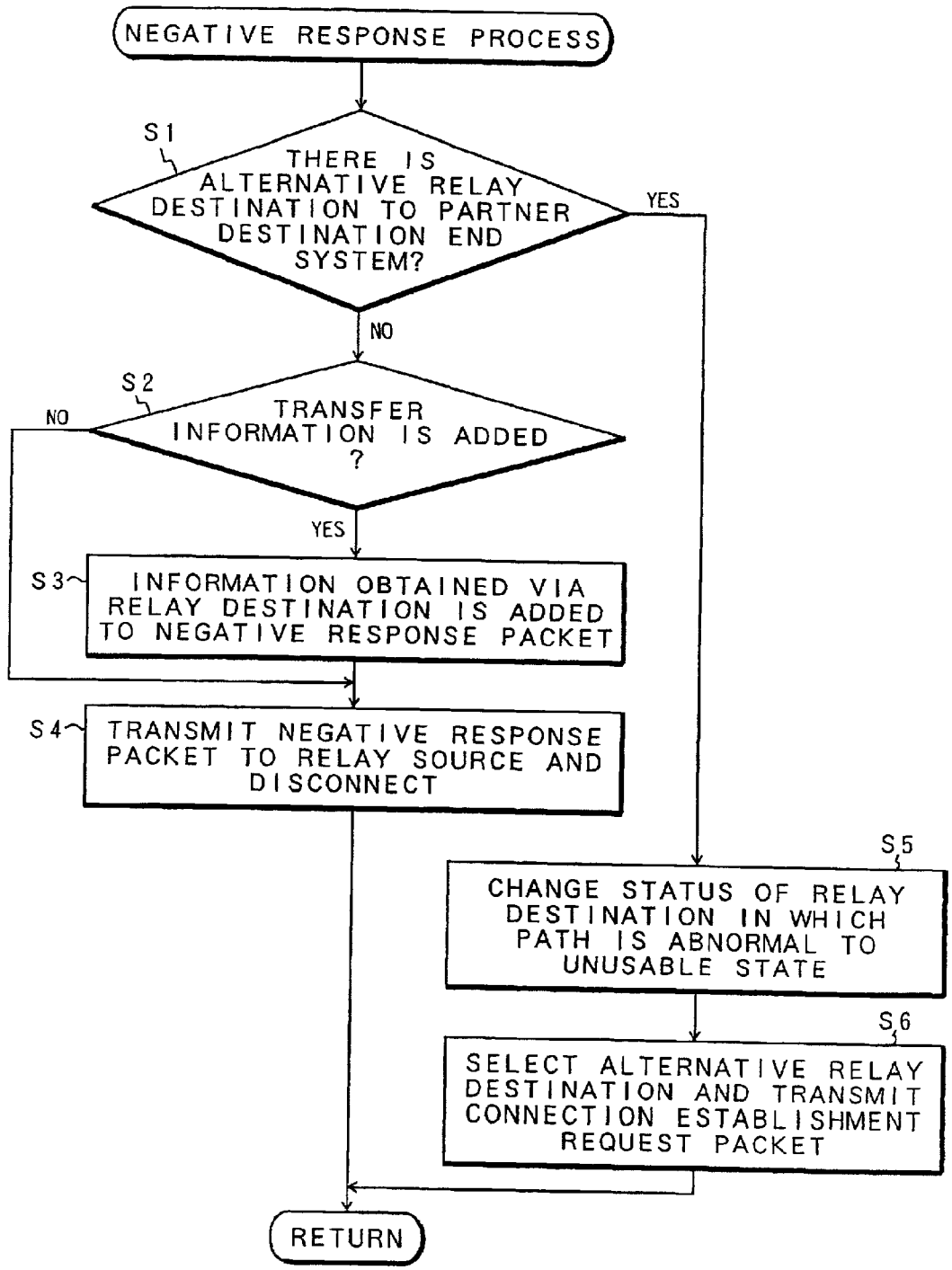
FIG. 12 is a flowchart for a negative response process in FIG. 10.

FIG. 12 is a flowchart for the negative response process in the relay apparatus in step S4 in FIG. 10. According to the negative response process in the relay apparatus, whether there is an alternative relay destination to the partner destination end system 12 when the negative response packet is received or not is discriminated in step S1. If there is not the alternative relay destination, the presence or absence of the addition of the transfer information by the relay apparatus itself is discriminated in step S2. If there is the addition, for example, the self IP address is added to the negative response packet as information showing the passage via the relay destination in step S3. The negative response packet is transmitted to the relay source, thereby disconnecting the connection in step S4. If the relay apparatus has the alternative relay destination to the partner destination end system in step S1, step S5 follows and a status of the path abnormal relay destination is changed to the unusable state. After that, the alternative relay destination is selected and the connection establishment request packet is transmitted to another relay destination in step S6. Since the relay apparatus at the halfway does not have two or more relay destinations in the first embodiment of FIG. 1, it is impossible to cope with the switching of the path of the connection establishment request in the relay apparatus in steps S5 and S6. However, if the relay apparatus at the halfway has two or more relay destinations, the connection establishment request can be issued by another path by switching the path in the relay apparatus at the halfway without relaying the negative response packet to the end system 10. The second embodiment of the invention of FIG. 14 copes with the process for switching in the relay apparatuses at the halfway.

Figure 13:
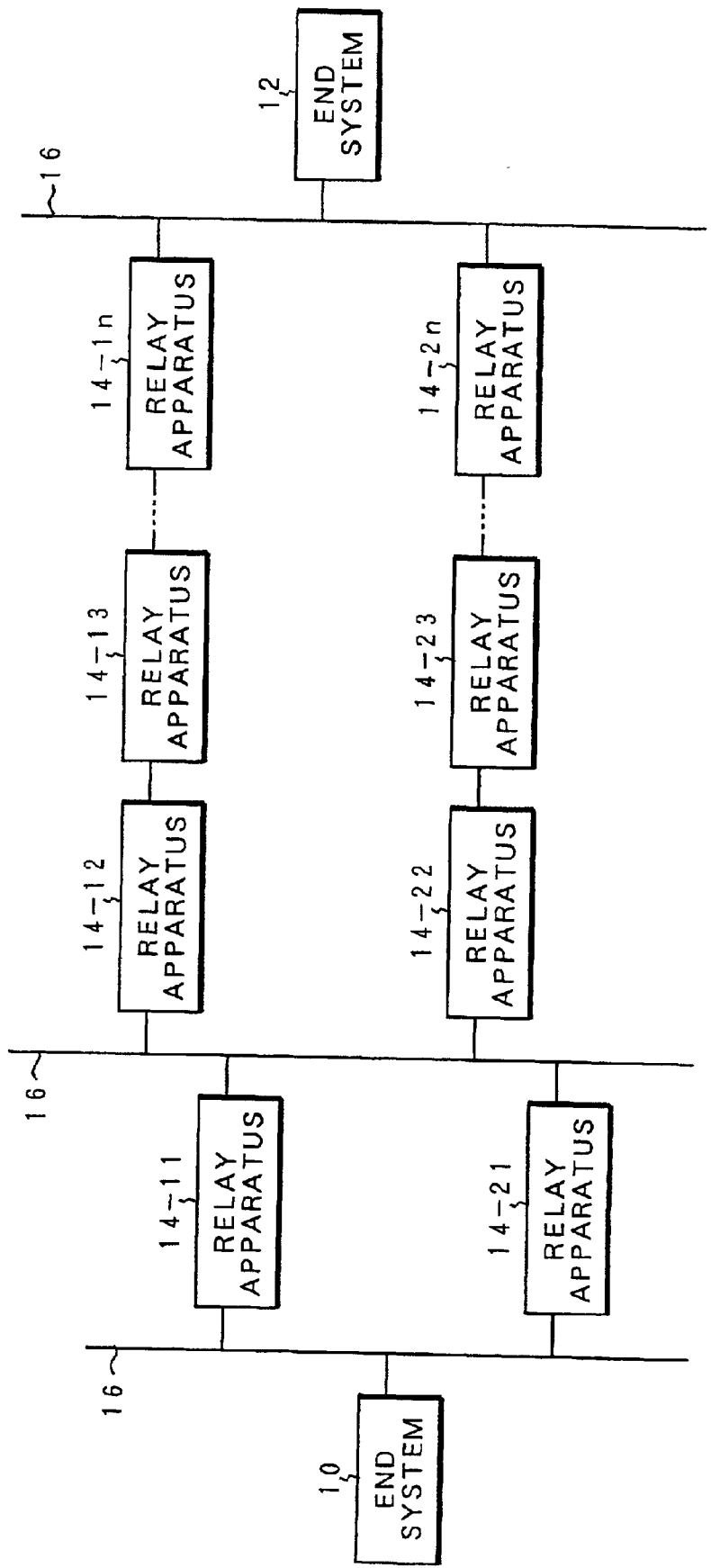
FIG. 13 is an explanatory diagram of a network in the second embodiment of the invention in case of switching in a relay apparatus adjacent to an end system.

FIG. 13 shows the second embodiment of a communication system of the invention. Although the connection establishment request for the path fault is switched on the end system 10 side in the first embodiment of FIG. 1, the second embodiment is characterized in that it is switched in the relay apparatus at the halfway. According to a network construction of the second embodiment, the end system 10 has two relay apparatuses 14-11 and 14-21 as relay destinations and, at the same time, each of the relay apparatuses 14-11 and 14-21 also has two relay apparatuses 14-12 and 14-22 as relay destinations.

Figure 14:
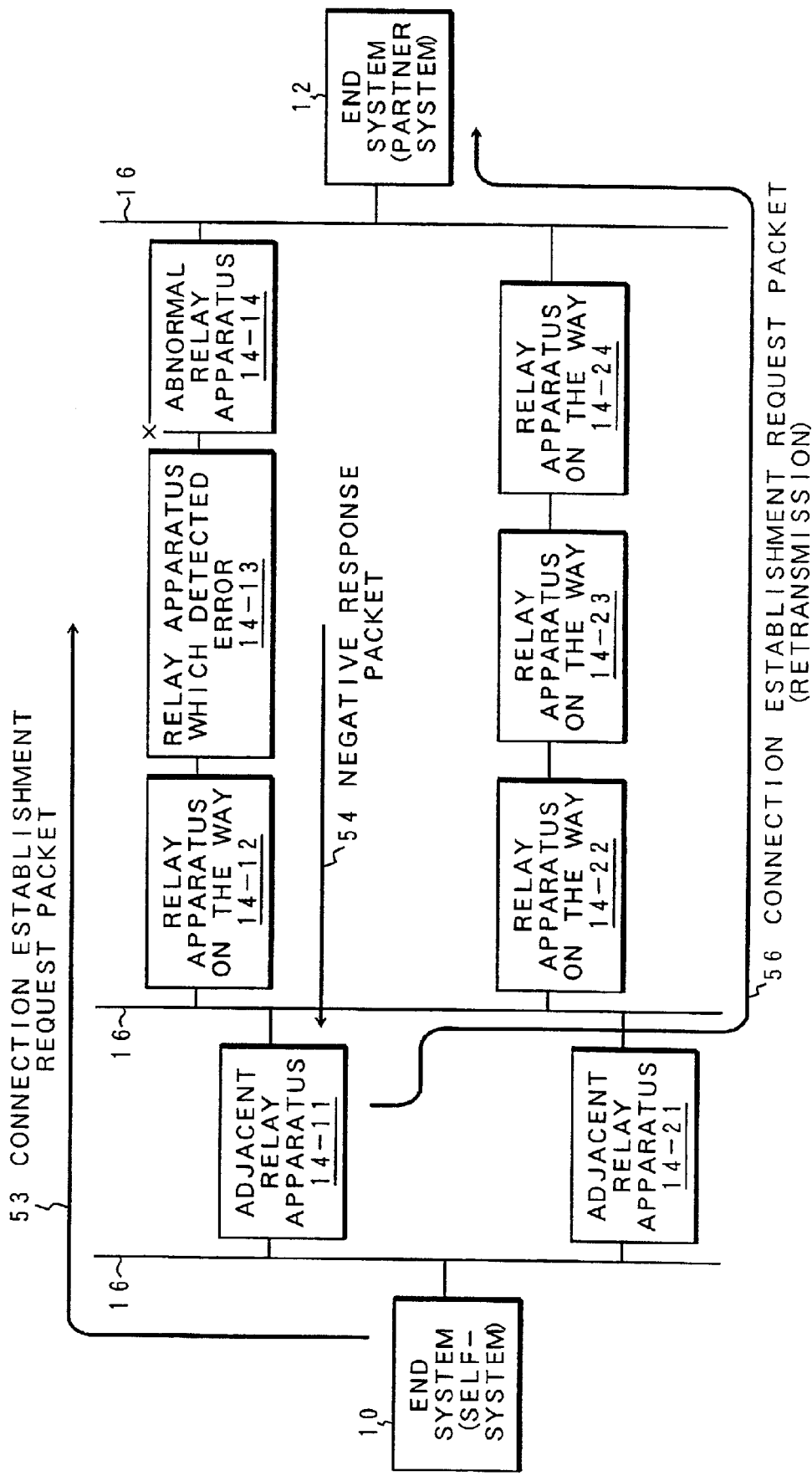
FIG. 14 is an explanatory diagram for the switching process according to the second embodiment in FIG. 13.

FIG. 14 is an explanatory diagram of a communicating process in the case where an error occurs in the relay apparatus at the halfway in the second embodiment of FIG. 13. On the basis of the communicating request of the application of the end system 10, the end system 10 transmits a connection establishment request packet 53 to the adjacent relay apparatus 14-11. The connection establishment request packet 53 is relayed to the relay apparatuses 14-12 and 14-13. However, when it is relayed to the relay apparatus 14-13, the relay apparatus 14-13 recognizes an error of the next relay apparatus 14-14 and transmits a negative response packet 54 to the relay apparatus 14-12. The packet 54 is further transmitted from the relay apparatus 14-12 to the relay apparatus 14-11. The relay apparatus 14-11 which received the negative response packet 54 has the relay apparatus 14-22 as an alternative relay apparatus besides the relay apparatus 14-12 as a path fault relay destination. Therefore, after the status of the relay apparatus 14-12 is changed to the unusable state, a connection establishment request packet 56 is retransmitted to the relay apparatus 14-22 as an alternative destination. The connection establishment request packet 56 is relayed by the relay apparatuses 14-23 and 14-24 and finally relayed to the end system 12. Thus, a TCP connection via the relay apparatuses 14-11, 14-22, 14-23, and 14-24 from the end system 10 is established and data communication from the end system 10 is started.

Figure 15A:
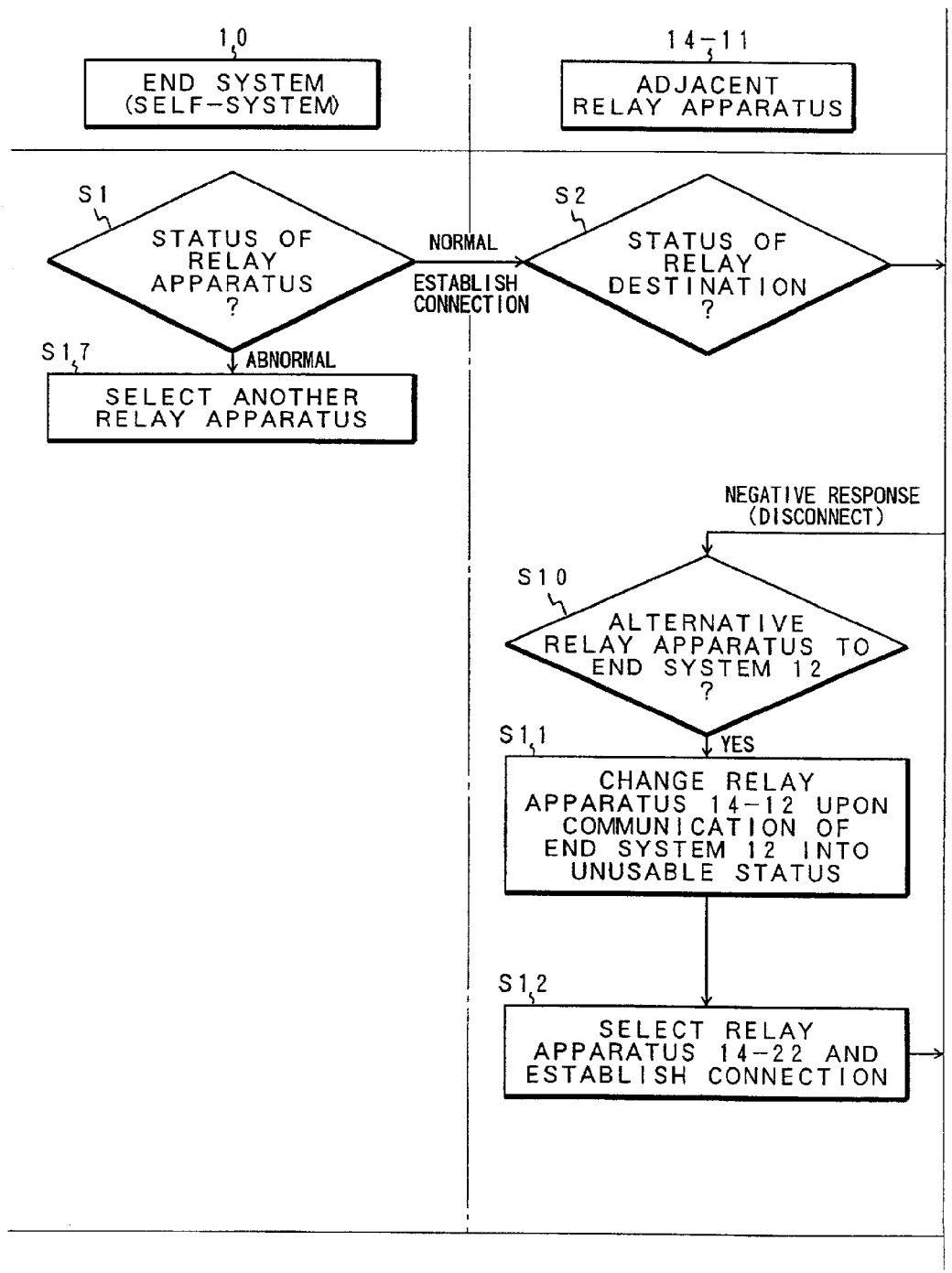
Figure 15B:
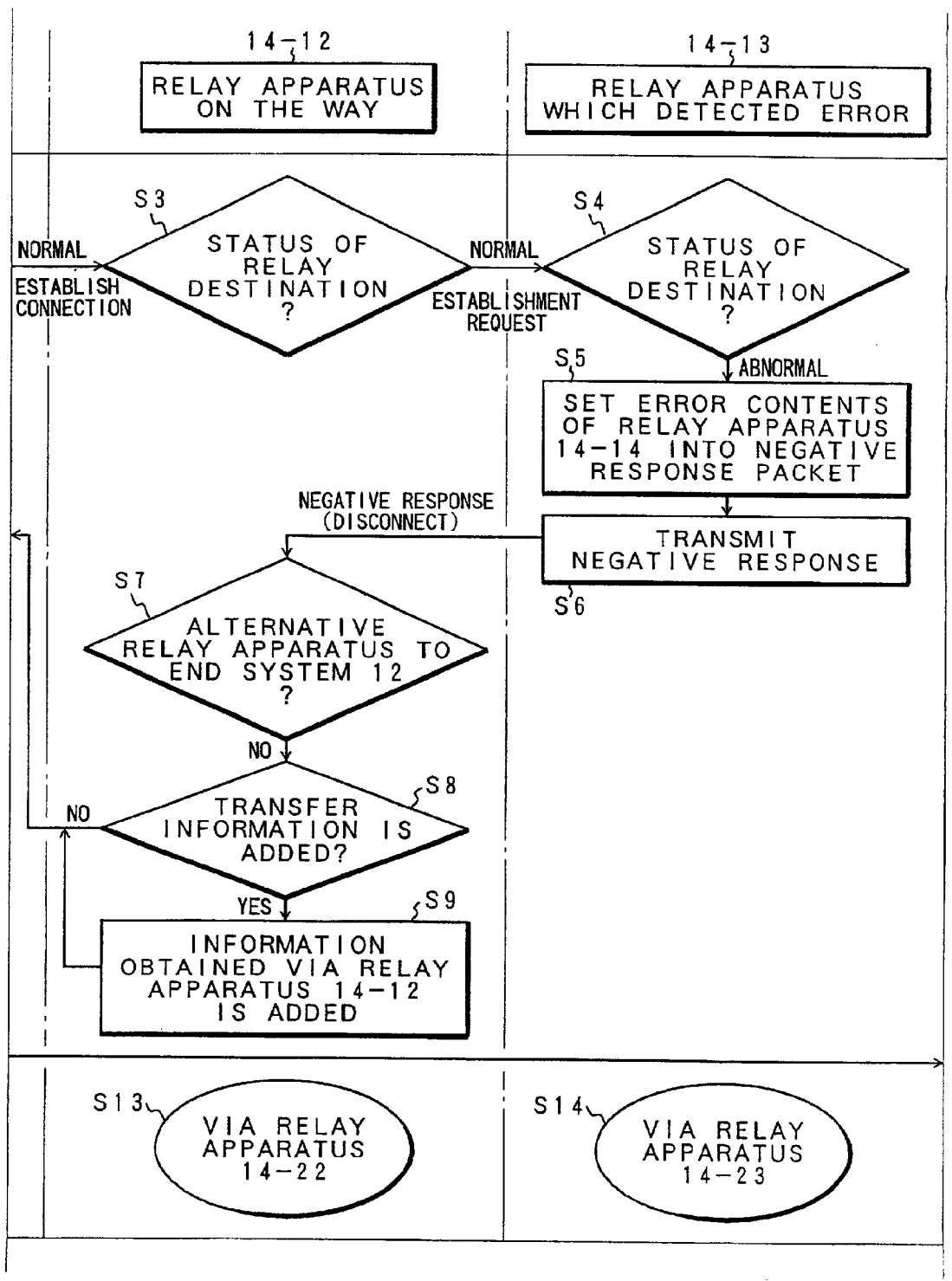

FIGS. 15A, 15B, and 15C are time charts showing the details of the communicating process for switching in the relay apparatuses at the halfway in FIG. 14. First, when the application of the end system 10 of the communicating source issues the communicating request, a status of the adjacent relay apparatus 14-11 is discriminated in step S1. Since it is normal, the connection establishment request packet is transmitted. The relay apparatus 14-11 discriminates a status of the next relay apparatus 14-12 in step S2. Since it is normal, the connection establishment request packet is similarly transmitted. Similarly, the relay apparatus 14-12 discriminates a status of the next relay apparatus 14-13 in step S3. Since it is normal, the connection establishment request packet is transmitted. The relay apparatus 14-13 discriminates a status of the next relay apparatus 14-14 when the packet is received. In this case, since the relay apparatus 14-14 is abnormal, the processing routine advances to step S5. The error contents of the relay apparatus 14-14 are set into the negative response packet. In step S6, the negative response packet is transmitted to the relay apparatus 14-12 of the relay source, thereby disconnecting the connection. The relay apparatus 14-12 discriminates the presence or absence of an alternative relay apparatus for the end system 12 in step S7. Since there is no alternative relay apparatus in this case, the presence or absence of the addition of the transfer information is discriminated in step S8. If there is the addition, the self IP address via the relay apparatus 14-12 is added in step S9. After that, the negative response packet is transmitted to the relay apparatus 14-11, thereby disconnecting the connection. The relay apparatus 14-11 discriminates the presence or absence of an alternative relay apparatus for the end system 12 in step S11. Since there is the alternative relay apparatus 14-22 in this case, the status of the relay apparatus 14-12 in which the path fault occurred is changed to the unusable state in step S11. After that, the relay apparatus 14-22 as an alternative relay apparatus is selected in step S12 and the connection establishment request packet is transmitted. Therefore, the connection establishment request packet switched by the relay apparatus 14-11 passes through the relay apparatuses 14-22, 14-23, and 14-24 as shown in steps S13, S14, and S15 and, thereafter, is relayed to the end system 12. A connection is established in step S16, so that data communication from the end system 10 of the communicating source is started.

Figure 16:
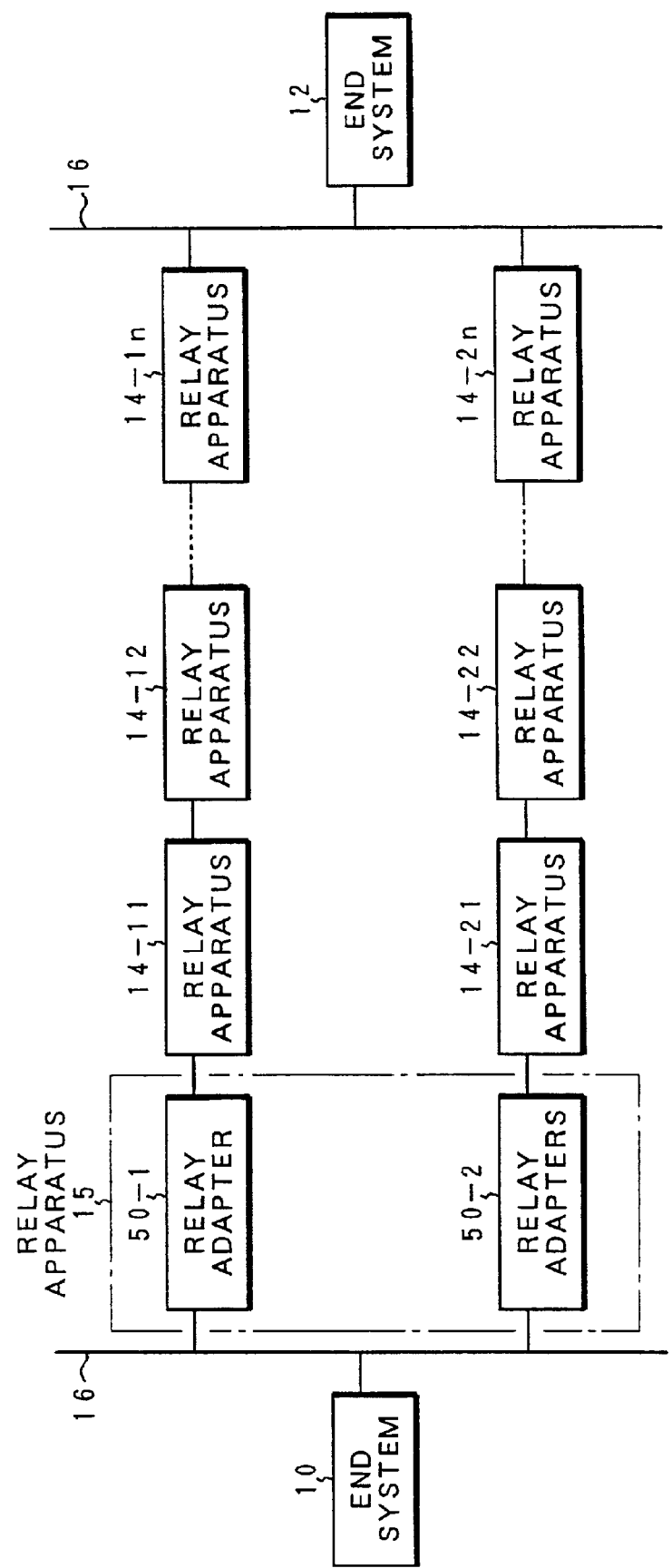
FIG. 16 is an explanatory diagram of a network in the third embodiment of the invention in which a relay apparatus adjacent to an end system has a plurality of adapters.

FIG. 16 shows the third embodiment of a communication system according to the invention. According to the third embodiment, since relay functions are multiplexed and provided for the relay apparatus provided adjacently to the end system 10, the end system has a plurality of relay destinations. A relay apparatus 15 adjacent to the end system 10 has, for example, relay adapters 50-1 and 50-2. Each of the relay adapters 50-1 and 50-2 is constructed by hardware as an individual processing apparatus and has an independent IP address. By collectively providing a virtual IP address for such two relay adapters 50-1 and 50-2, those adapters are installed as one relay apparatus 15. By providing the relay adapters 50-1 and 50-2 having a function as, for example, two gateways for performing a TCP relay into the relay apparatus 15 as mentioned above, for example, when the end system 10 receives the negative response packet due to the path fault on the relay adapter 50-1 side, the relay adapter 50-2 of the relay apparatus 15 serving as an alternative relay destination is selected and the connection establishment request packet is retransmitted, thereby enabling a TCP connection to be established between the relay apparatus 15 and end system 12 by a path of the other relay apparatuses 14-21 to 14-2n.

Figure 17:
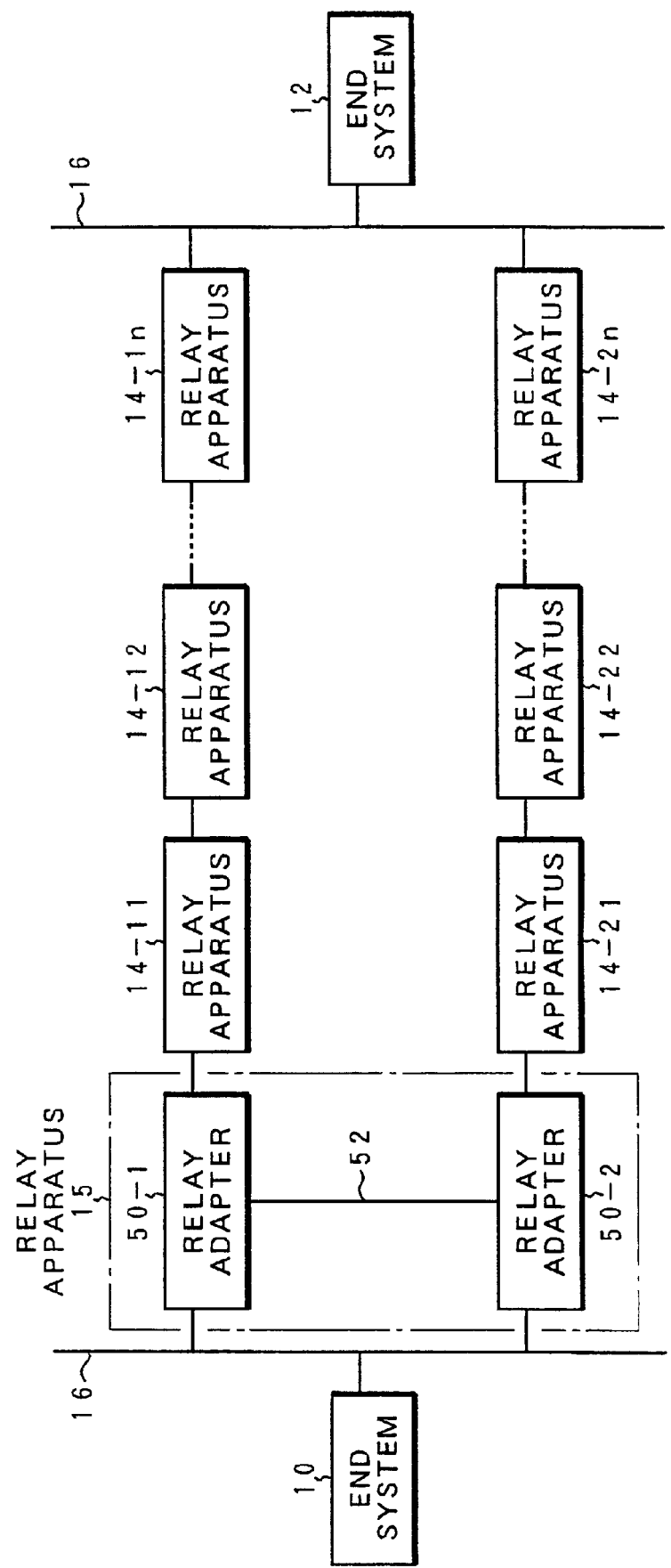
FIG. 17 is an explanatory diagram of a network in the fourth embodiment of the invention in case of switching in adapters in a relay apparatus adjacent to an end system.

FIG. 17 shows the fourth embodiment of a communication system according to the invention. The relay apparatus 15 adjacent to the end system 10 has, for example, two relay adapters 50-1 and 50-2 in a manner similar to the third embodiment of FIG. 16. In addition to them, according to the fourth embodiment, further, internal information can be exchanged between the relay adapters 50-1 and 50-2 by a transmission path 52. Since the relay apparatus 15 has the relay adapters 50-1 and 50-2 connected by the transmission path 52 which can exchange the internal information as mentioned above, for example, when the end system 10 selects the relay adapter 50-1 and issues the connection establishment request, a path fault occurs at the halfway, and when the negative response packet for the path fault is received by the relay adapter 50-1, the relay adapter 50-1 instructs the relay adapter 50-2 to switch the connection establishment request by the transmission of the internal information via the transmission path 52. Therefore, the connection establishment request to the end system 12 can be issued again by the path passing through the relay apparatus 14-21 from the relay adapter 50-2 serving as another relay destination in the relay apparatus 15 at the foreground without switching the connection establishment request on the end system 10 side. In this case, the relay adapter 50-1 transmits the internal information to the relay adapter 50-2 by the transmission path 52 and issues the connection establishment request again to another relay destination. After that, the negative response packet is transmitted to the end system 10. The end system 10 changes a status of the relay adapter 50-1 in which the fault occurred from the negative response packet to an unusable state. Therefore, when the next and subsequent communicating requests are issued, the end system 10 selects the relay adapter 50-2 side in the relay apparatus 15 and issues the connection establishment request.

Figure 18:
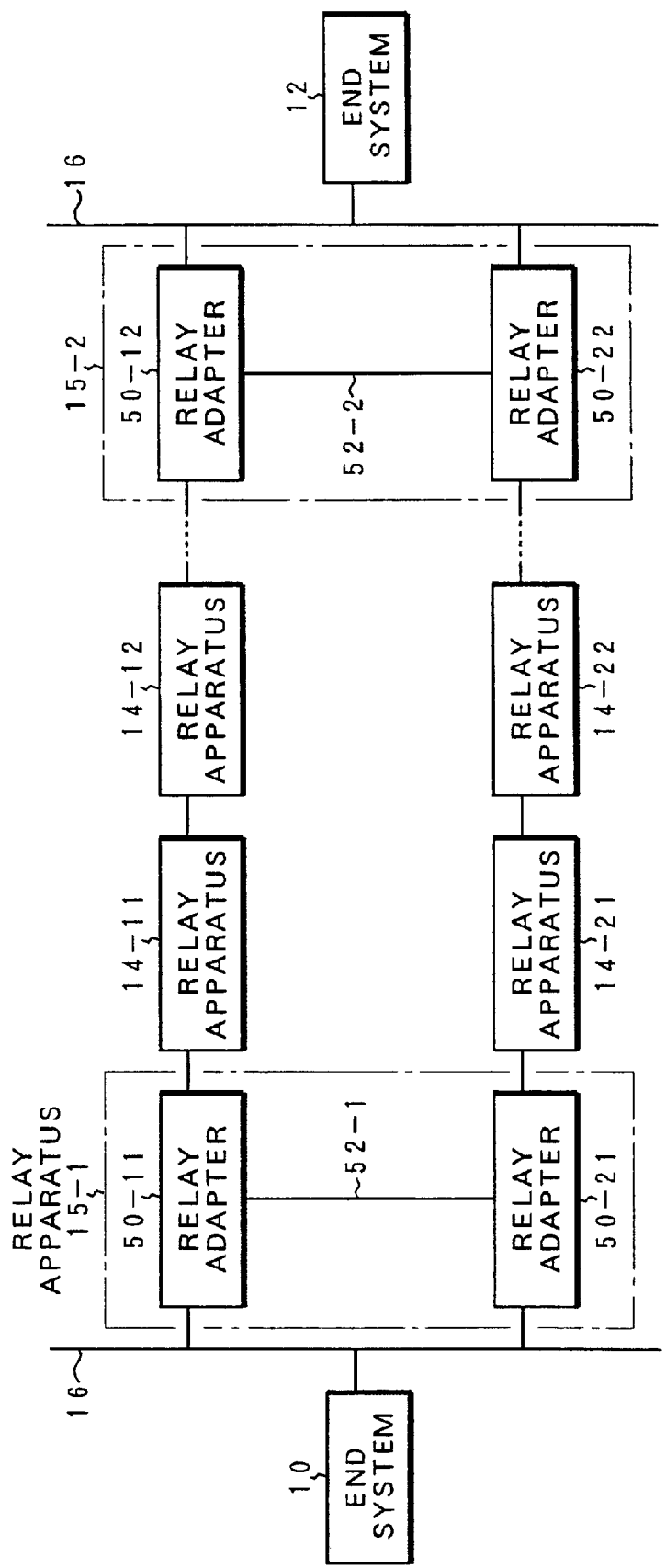
FIG. 18 is an explanatory diagram of a network in the fifth embodiment of the invention in case of switching in adapters in relay apparatuses adjacent to end systems of a communicating source and a communicating destination.

FIG. 18 shows the fifth embodiment of a communication system according to the invention. According to the fifth embodiment, a relay apparatus 15-1 adjacent to the end system 10 of the communicating source has relay adapters 50-11 and 50-21 and a transmission path 52-1 for transmitting internal information. In addition to them, a relay apparatus 15-2 is also provided adjacently to the end system 12 of the communicating destination. The relay apparatus 15-2 has two relay adapters 50-12 and 50-22, thereby enabling the internal information to be mutually transmitted and received by a transmission path 52-2. As mentioned above, the relay apparatuses 15-1 and 15-2 having a plurality of relay apparatuses and a switching system for transmitting the internal information are provided adjacently to the end systems 10 and 12 for performing data communication, respectively. Therefore, when the connection establishment request is issued from the end system 10, a path fault occurs and the path can be switched. At the same time, on the contrary, with respect to the connection establishment request by the communicating request from the end system 12 side, a connection can be established by switching the path to another path for the same path fault. Thus, in a case where the communicating requests are mutually issued between the end systems 10 and 12, a connection can be certainly established by another path which avoids the path fault. Even if there is a path fault, data communication can be started in a short time.

According to the invention as mentioned above, when a connection via a plurality of relay apparatuses is established between the end system of the communicating source and the end system of the communicating destination and data is communicated, even if the establishment of the connection fails due to an error of the relay apparatus at the halfway or the like, the negative response packet is returned to the end system of the communicating source as soon as the error occurs and the path fault is recognized. When the path fault is recognized, a connection via another relay apparatus is established without notifying the application of the path fault. A connection to the partner destination end system in which a fault path is avoided can be established in a short time and data communication (business) can be started. When a path fault due to an error of the relay apparatus is detected at the time of establishment of the connection from the end system, a connection via another communication path can be established in a real-time manner and communication can be started. Therefore, even in case of switching a multiplexed large-scale network such as Internet, provider, or the like, there is no need to monitor a fault through the end system of the partner destination. Further, since the detection of the path fault and the switching can be performed by using only the packet which is used for communication, a special mechanism such as a ping for monitoring a fault is not particularly necessary. A load of the network and a burden on the end system and relay apparatuses can be reduced for this reason. Naturally, by combining the invention with the fault monitoring function such as a ping or the like, wasteful retransmission of the data communication and vain connection delay can be avoided owing to the fault monitor and path switching according to the invention during a period of time until a result of the monitor which is performed every predetermined time is reflected to routing information. Further, by the relay of the negative response at the time of detection of the path error, in which relay apparatus and by which reasons the connection has been refused can be recognized on the end system side. It is possible to promptly and properly take a countermeasure such as recovery, repair, or the like against the path fault.

Although the path can be switched at the positions of the relay apparatuses adjacent to the end systems 10 and 12 in the foregoing embodiments, the arranging positions of the relay apparatuses for performing the path switching are not necessarily limited to the positions adjacent to the end systems. If a plurality of relay destinations are provided at the stage of the proper relay apparatus provided at the halfway of the network, it is possible to select another relay destination for the path fault and switch the path at this portion. The present invention incorporates many proper variations and modifications without losing the objects and advantages of the invention. Further, the invention is not limited by the numerical values shown in the embodiments.

What is claimed is:

1. A communication system for establishing a connection via a plurality of relay apparatuses between an end system of a communicating source and an end system of a communicating destination and communicating data, wherein each of said relay apparatuses comprises:

a connection negative response unit which, when an error of a next relay destination is detected at the time of reception of a connection establishment request, refuses the connection establishment request and transmits a negative response to a relay source; and a negative response relay unit which, when said negative response is received from the relay destination, transmits the received negative response to the relay source, and said end system of the communicating source has a connection establishment requesting unit which, when said negative response is received from the relay destination after said connection establishment request is transmitted, issues again the connection establishment request in which another relay destination has been selected without notifying an application of a failure of the connection establishment and establishes a connection to the communicating destination end system by another path.

2. A system according to claim 1, wherein said end system of the communicating source has a plurality of relay apparatuses as a plurality of relay destinations, and in the case where the negative response is received after a specific relay apparatus is selected and the connection establishment request is transmitted, said communicating source end system selects another relay apparatus and retransmits the connection establishment request.

3. A system according to claim 1, wherein said end system of the communicating source has a plurality of relay adapters provided for one relay apparatus as a plurality of relay destinations, and in the case where the negative response is received after a specific relay adapter is selected and the connection establishment request is transmitted, said communicating source end system selects another relay adapter and retransmits the connection establishment request.

4. A system according to claim 1, wherein said relay apparatus has a relay selecting unit which, when said negative response is received from the relay destination after said connection establishment request is relayed, issues again the connection establishment request in which another relay destination has been selected and establishes a connection to said communicating destination, end system by another path.

5. A system according to claim 4, wherein said relay apparatus has a plurality of relay apparatuses as a plurality of relay destinations, and in the case where the negative response is received after a specific relay, apparatus is selected and the connection establishment request is transmitted, said relay apparatus selects another relay apparatus and retransmits the connection establishment request.

6. A system according to claim 4, wherein said relay apparatus has a plurality of relay adapters provided for one relay apparatus as a plurality of relay destinations, and in the case where the negative response is received after a specific relay adapter is selected and the connection establishment request is transmitted, said relay apparatus selects another relay adapter and retransmits the connection establishment request.

7. A system according to claim 1, wherein each of said end system and said relay apparatuses switches a communication path by 4-layer switches for establishing a TCP connection.

8. A system according to claim 1, wherein:

said negative response relay unit of said relay apparatus stores refusal reasons and location information of a fault occurrence relay apparatus into an optional area or a user data area of a negative response packet and transmits them to the relay source; and when said negative response packet is received, said connection establishment requesting unit of said communicating source end system changes a status of the relay destination in which a fault path occurred to an unusable state and, thereafter, selects another relay destination and retransmits the connection establishment request.

9. A system according to claim 8, wherein the location information of an abnormal relay apparatus which is stored in said negative response packet is an IP address of the abnormal relay apparatus and the number of hopping times indicative of the number of normal relay apparatuses to the abnormal relay apparatus.

10. A system according to claim 8, wherein said negative response relay unit of said relay apparatus further stores a self IP address into the optional area or user data area of said negative response packet and transmits it to the relay source.

11. A relay apparatus for establishing a connection between an end system of a communicating source and an end system of a communicating destination and communicating data, comprising:

a connection negative response unit which, when an error of a relay destination is detected at the time of reception of a connection establishment request, refuses the connection establishment request and transmits a negative response to a relay source; and a negative response relay unit which, when said negative response is received from the relay destination, transmits the received negative response to the relay source; and wherein said negative response relay unit stores refusal reasons, an IP address of an abnormal relay apparatus indicative of a location of a fault occurrence relay apparatus, and the number of hopping times indicative of the number of normal relay apparatuses to the abnormal relay apparatus into an optional area or a user data area of a negative response packet and transmits them to the relay source.

12. An end system for establishing a connection via a plurality of relay apparatuses and communicating data, comprising:

an application unit which issues a communicating request by setting a specific end system to a partner destination; and a connection establishment requesting unit which, when a negative response is received from a relay destination after a connection establishment request based on said communicating request is transmitted, issues again a connection establishment request in which another relay destination has been selected without notifying said application unit of a failure of the connection establishment and establishes a connection to a communicating destination end system by another path.

13. A system according to claim 12, wherein when a negative response packet is received, said connection establishment requesting unit changes a status of the relay destination in which a fault path occurred to an unusable state and, thereafter, selects another relay destination and retransmits the connection establishment request.

14. A communicating method of establishing a connection via a plurality of relay apparatuses between an end system of a communicating source and an end system of a communicating destination and communicating data, comprising the steps of:

when an error of a next relay destination is detected in one of said relay apparatuses at the time of reception of a connection establishment request, refusing the connection establishment request and transmitting a negative response to a relay source; and when the relay apparatus receives said negative response from a relay destination, transmitting the received negative response to the relay source from said relay apparatus, wherein when said negative response is received from the relay destination after said connection establishment request is transmitted, said end system of the communicating source issues again the connection establishment request in which another relay destination has been selected without notifying an application of a failure of the connection establishment and establishes a connection to the communicating destination end system by another path.

\* \* \* \* \*